(12) United States Patent
Bernat et al.

(10) Patent No.: US 10,990,309 B2
(45) Date of Patent: Apr. 27, 2021

(54) TECHNOLOGIES FOR COORDINATING DISAGGREGATED ACCELERATOR DEVICE RESOURCES

(71) Applicant: Intel Corporation, Santa Clara, CA (US)

(72) Inventors: Francesc Guim Bernat, Barcelona (ES); Evan Custodio, Seekonk, MA (US); Susanne M. Balle, Hudson, NH (US); Joe Grecco, Saddle Brook, NJ (US); Henry Mitchel, Wayne, NJ (US); Slawomir Putyrski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 15/721,833

(22) Filed: Sep. 30, 2017

(65) Prior Publication Data
US 2018/0150330 A1 May 31, 2018

Related U.S. Application Data

(60) Provisional application No. 62/427,268, filed on Nov. 29, 2016.

(30) Foreign Application Priority Data

Aug. 30, 2017 (IN) .............................. 201741030632

(51) Int. Cl.
*G06F 9/46* (2006.01)
*G06F 3/06* (2006.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ........ G06F 3/0641; G06F 8/656; G06F 8/658; G06F 8/654; G06F 16/1744;
(Continued)

(56) References Cited

U.S. PATENT DOCUMENTS 9,026,765 B1  5/2015  Marshak et al.
10,034,407 B2  7/2018  Miller et al.
(Continued)

OTHER PUBLICATIONS

Fahmy et al, Virtualized FPGA Accelerators for Efficient Cloud Computing, IEEE, 2015, pp. 430-435.*
(Continued)

*Primary Examiner* — Diem K Cao
(74) *Attorney, Agent, or Firm* — Compass IP Law PC

(57) ABSTRACT

A compute device to manage workflow to disaggregated computing resources is provided. The compute device comprises a compute engine receive a workload processing request, the workload processing request defined by at least one request parameter, determine at least one accelerator device capable of processing a workload in accordance with the at least one request parameter, transmit a workload to the at least one accelerator device, receive a work product produced by the at least one accelerator device from the workload, and provide the work product to an application.

28 Claims, 18 Drawing Sheets

(51) Int. Cl.

| | | |
|---|---|---|
| G06F 16/174 | (2019.01) | |
| G06F 21/57 | (2013.01) | |
| G06F 21/73 | (2013.01) | |
| G06F 8/65 | (2018.01) | |
| H04L 12/24 | (2006.01) | |
| H04L 29/08 | (2006.01) | |
| G06F 11/30 | (2006.01) | |
| G06F 9/50 | (2006.01) | |
| H01R 13/453 | (2006.01) | |
| G06F 9/48 | (2006.01) | |
| H03M 7/30 | (2006.01) | |
| H03M 7/40 | (2006.01) | |
| H04L 12/26 | (2006.01) | |
| H04L 12/813 | (2013.01) | |
| H04L 12/851 | (2013.01) | |
| G06F 11/07 | (2006.01) | |
| G06F 11/34 | (2006.01) | |
| G06F 7/06 | (2006.01) | |
| G06T 9/00 | (2006.01) | |
| H03M 7/42 | (2006.01) | |
| H04L 12/28 | (2006.01) | |
| H04L 12/46 | (2006.01) | |
| H04L 29/12 | (2006.01) | |
| G06F 13/16 | (2006.01) | |
| G06F 21/62 | (2013.01) | |
| G06F 21/76 | (2013.01) | |
| H03K 19/173 | (2006.01) | |
| H04L 9/08 | (2006.01) | |
| H04L 12/933 | (2013.01) | |
| G06F 9/38 | (2018.01) | |
| G06F 12/02 | (2006.01) | |
| G06F 12/06 | (2006.01) | |
| G06T 1/20 | (2006.01) | |
| G06T 1/60 | (2006.01) | |
| G06F 9/54 | (2006.01) | |
| G06F 8/656 | (2018.01) | |
| G06F 8/658 | (2018.01) | |
| G06F 8/654 | (2018.01) | |
| G06F 9/4401 | (2018.01) | |
| H01R 13/631 | (2006.01) | |
| H05K 7/14 | (2006.01) | |
| H04L 12/911 | (2013.01) | |
| G06F 11/14 | (2006.01) | |
| H04L 29/06 | (2006.01) | |
| G06F 15/80 | (2006.01) | |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/4843* (2013.01); *G06F 9/4881* (2013.01); *G06F 9/5005* (2013.01); *G06F 9/505* (2013.01); *G06F 9/5038* (2013.01); *G06F 9/5044* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *G06F 11/1453* (2013.01); *G06F 12/023* (2013.01); *G06F 15/80* (2013.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01)

(58) Field of Classification Search
CPC .... G06F 3/0604; G06F 3/0608; G06F 3/0611; G06F 3/0613; G06F 3/0617; G06F 3/0647; G06F 3/065; G06F 3/0653; G06F 3/067; G06F 7/06; G06F 8/65; G06F 9/3851; G06F 9/3891; G06F 9/4401; G06F 9/4881; G06F 9/5005; G06F 9/5038; G06F 9/505; G06F 9/544; G06F 11/0709; G06F 11/0751
See application file for complete search history.

(56) References Cited

U.S. PATENT DOCUMENTS

| 10,045,098 | B2 | 8/2018 | Adiletta et al. | |
|---|---|---|---|---|
| 10,085,358 | B2 | 9/2018 | Adiletta et al. | |
| 2010/0191823 | A1* | 7/2010 | Archer | G06F 9/5055 709/213 |
| 2012/0054770 | A1 | 3/2012 | Krishnamurthy et al. | |
| 2013/0179485 | A1 | 7/2013 | Chapman et al. | |
| 2013/0232495 | A1* | 9/2013 | Rossbach | G06F 9/5038 718/102 |
| 2015/0007182 | A1* | 1/2015 | Rossbach | G06F 9/4843 718/102 |
| 2017/0046179 | A1 | 2/2017 | Teh et al. | |
| 2017/0116004 | A1* | 4/2017 | Devegowda | G06F 9/44505 |
| 2017/0317945 | A1* | 11/2017 | Guo | H04L 67/1097 |
| 2018/0077235 | A1 | 3/2018 | Nachimuthu et al. | |
| 2018/0150298 | A1 | 5/2018 | Balle et al. | |
| 2018/0150299 | A1 | 5/2018 | Balle et al. | |
| 2018/0150330 | A1 | 5/2018 | Bemat et al. | |
| 2019/0065281 | A1* | 2/2019 | Bernat | G06F 11/3006 |

OTHER PUBLICATIONS

Caulfield et al, A Cloud-scale acceleration Architecture, Microsoft Corp, Oct. 2016, 13 pages.*

(56) References Cited

OTHER PUBLICATIONS

Artail et al. "Speedy Cloud: Cloud Computing with Support for Hardware Acceleration Services", 2017 IEEE, pp. 850-865.
Asiatici et al. "Virtualized Execution Runtime for FPGA Accelerators in the Cloud", 2017 IEEE, pp. 1900-1910.
Diamantopoulos et al. "High-level Synthesizable Dataflow Map Reduce Accelerator for FPGA-coupled Data Centers", 2015 IEEE, pp. 1-8.
Ding et al. "A Unified OpenCL-flavor Programming Model with Scalable Hybrid Hardware Platform on FPGAs", 2014 IEEE, 7 pages.

* cited by examiner

TECHNOLOGIES FOR COORDINATING DISAGGREGATED ACCELERATOR DEVICE RESOURCES

CROSS-REFERENCE TO RELATED APPLICATIONS

The present application claims the benefit of U.S. Provisional Patent Application No. 62/427,268, filed Nov. 29, 2016, and Indian Provisional Patent Application No. 201741030632, filed Aug. 30, 2017.

BACKGROUND

In modern cloud environments, compute devices (sometimes referred to as compute sleds) host many computer applications (e.g., workloads) that each perform specific functions. Each application requires processing power to complete various application tasks (e.g., functions, processes, operations within a workload), such as data processing but also input and output tasks such as displaying data, receiving data, or the like. Many of the abovementioned tasks are processed using computer programs that embody complex logic sequences. Such logic sequences often execute faster when carried out by a specialized component, such as a field programmable gate array, an application specific integrated circuit (ASIC), or other device specifically configured for performing such computation (e.g., an accelerator device). An accelerator device may be configured using, for example, a hardware definition language, to perform tasks assigned by a computer application.

Given that accelerator devices typically specialize in executing a particular type of task (e.g., encryption, compression, etc.), an operating system of the compute device, or the application executing on the compute device, typically must identify the available features of the accelerator device(s) and manage communications with the accelerator device(s), taking away from compute resources (e.g., processor cycles) that could otherwise be spent on executing the application.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
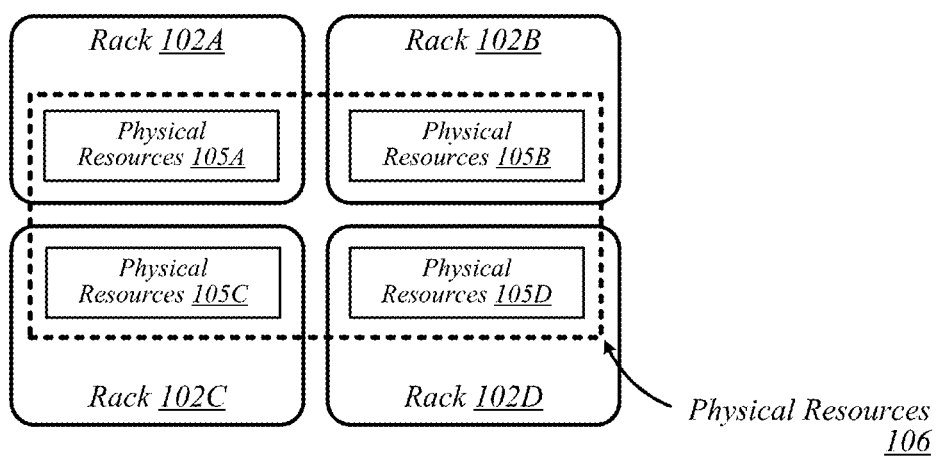
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
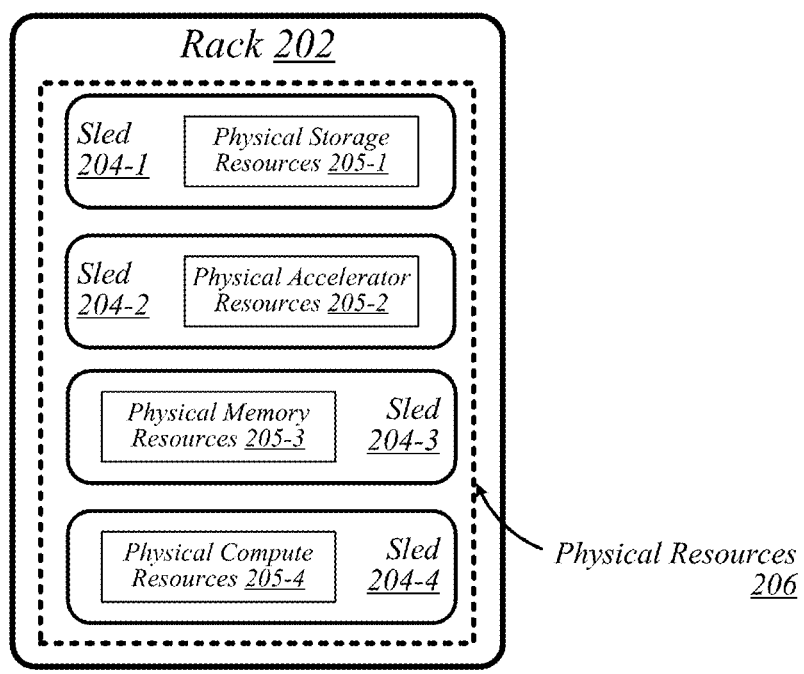
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
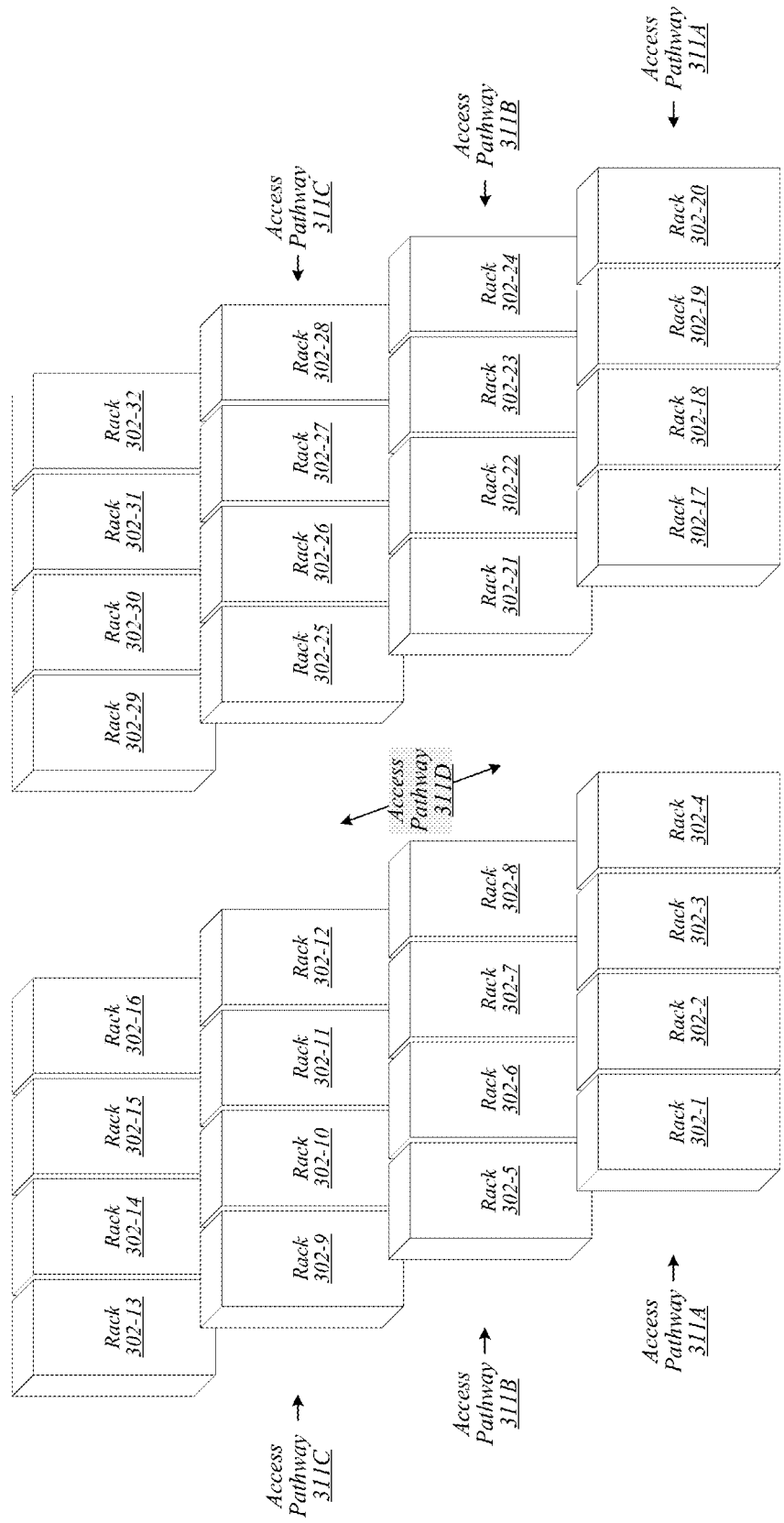
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
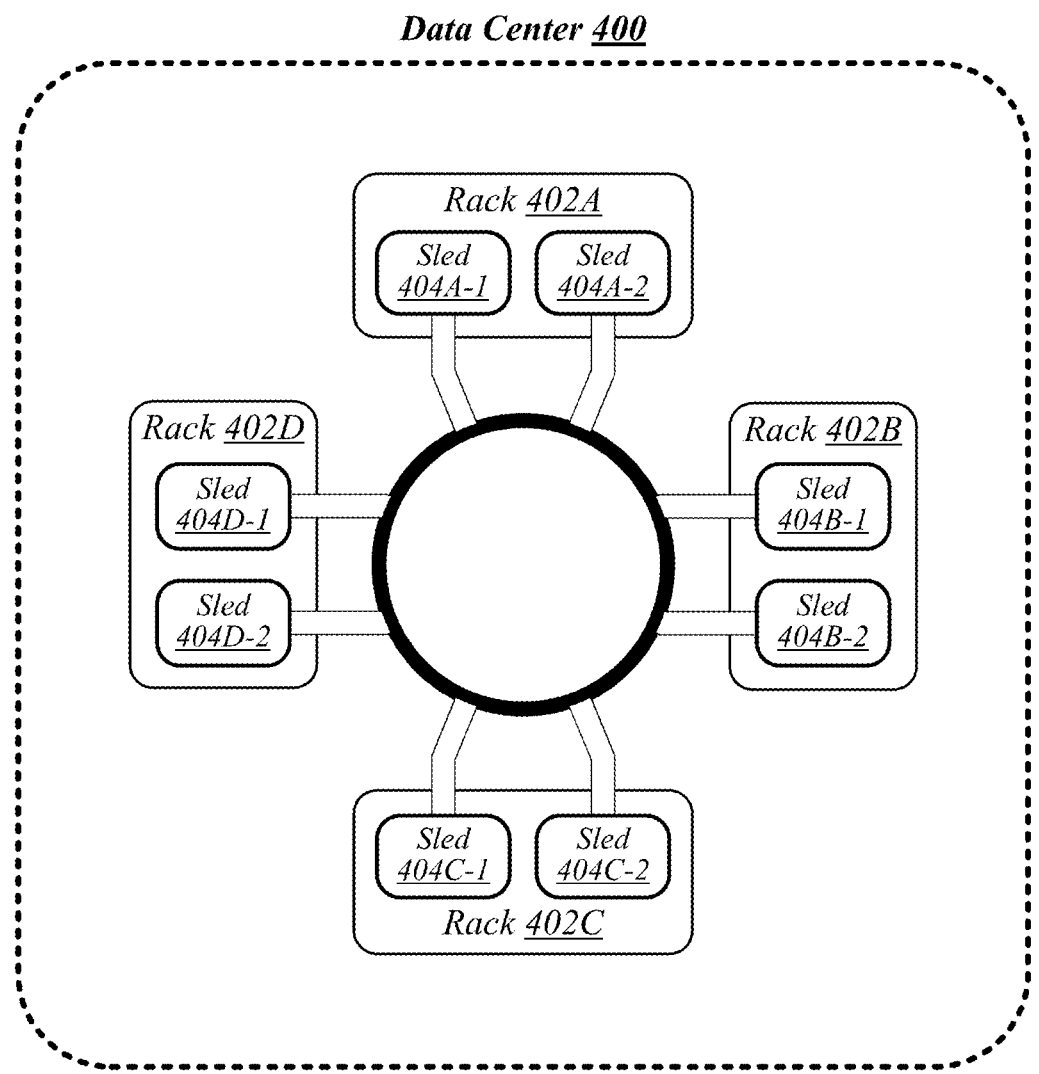
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
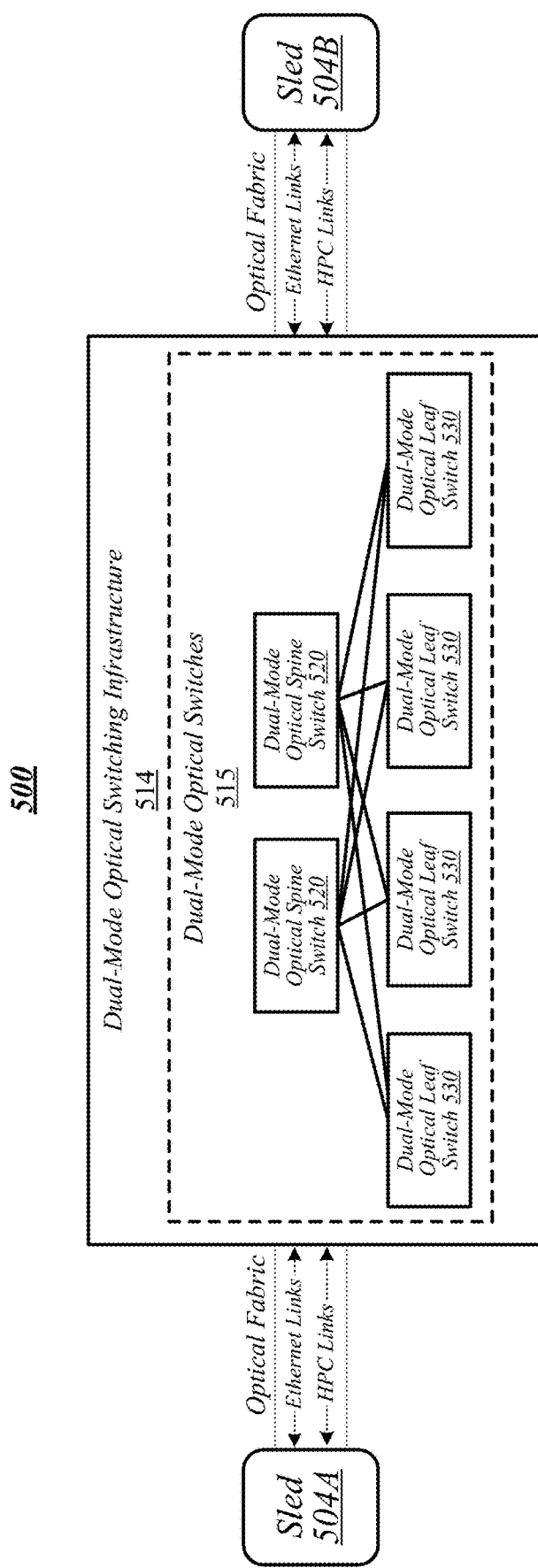
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
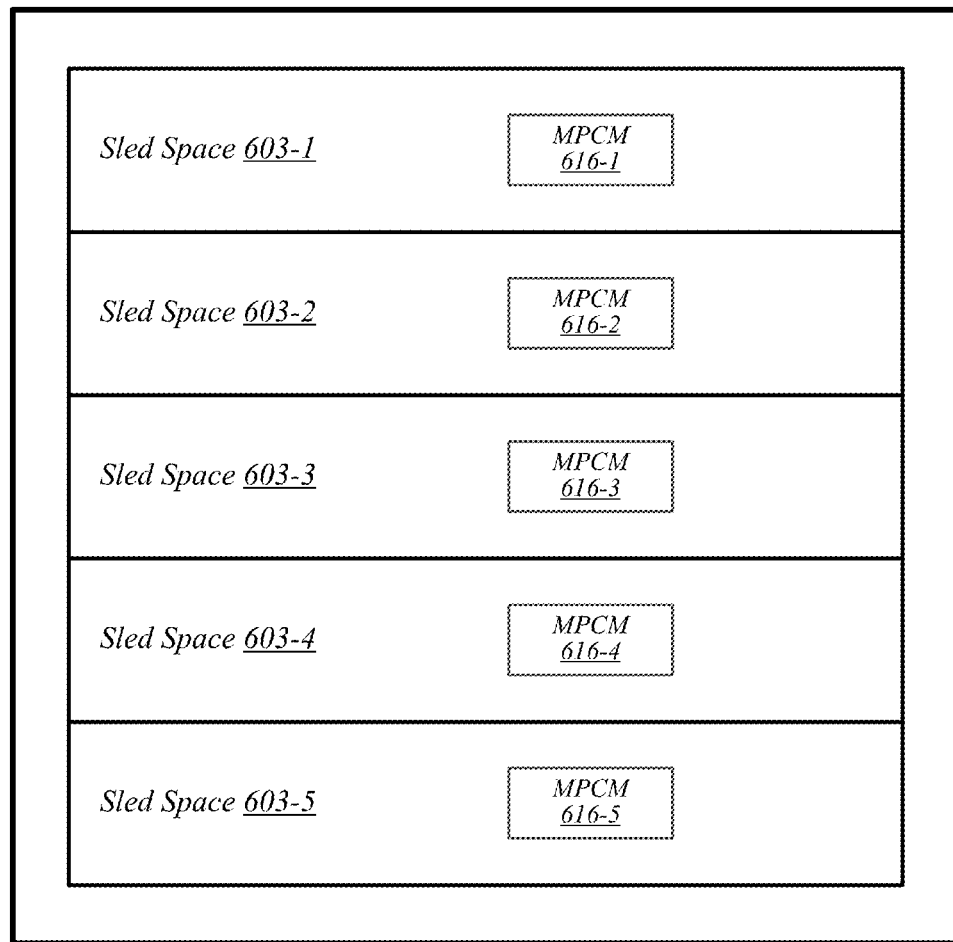
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
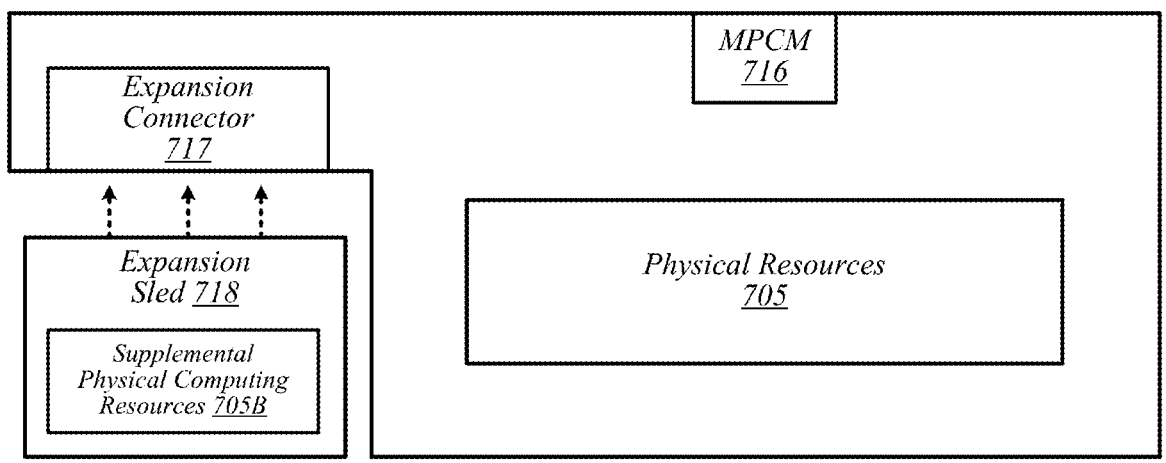
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
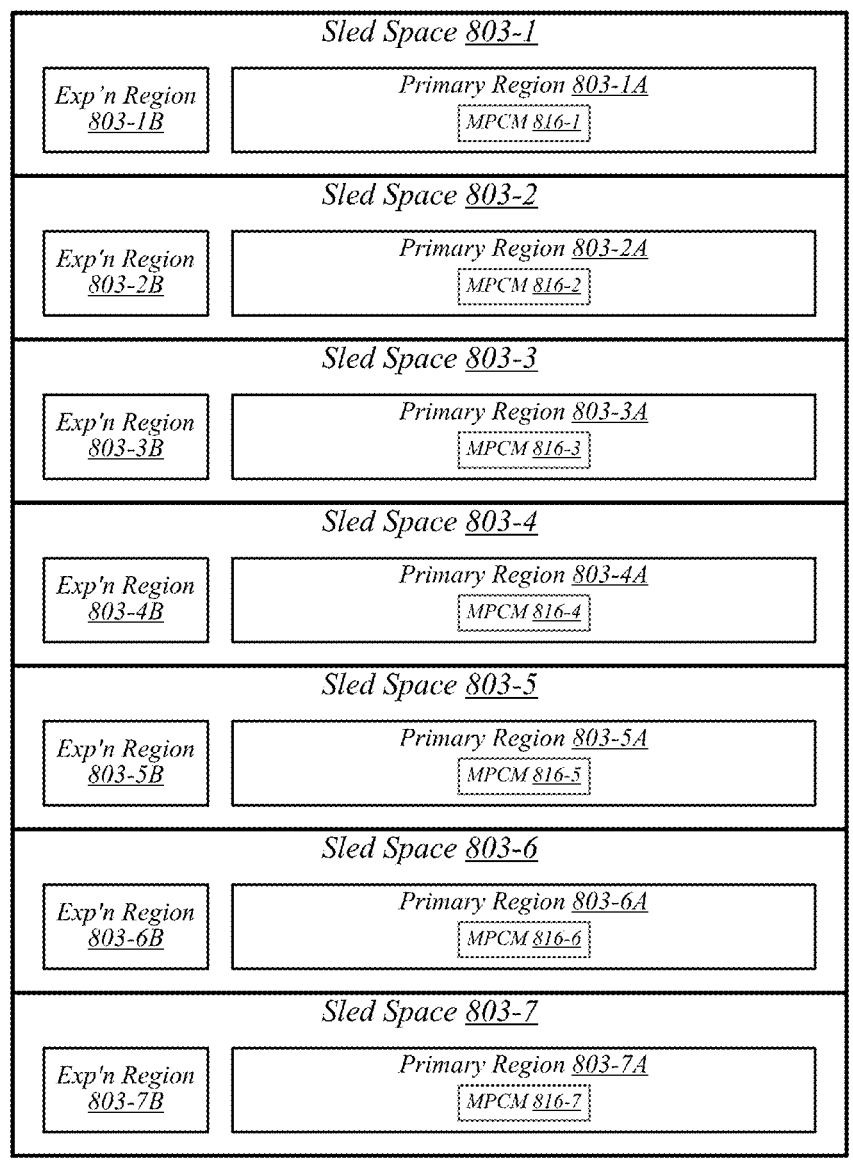
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
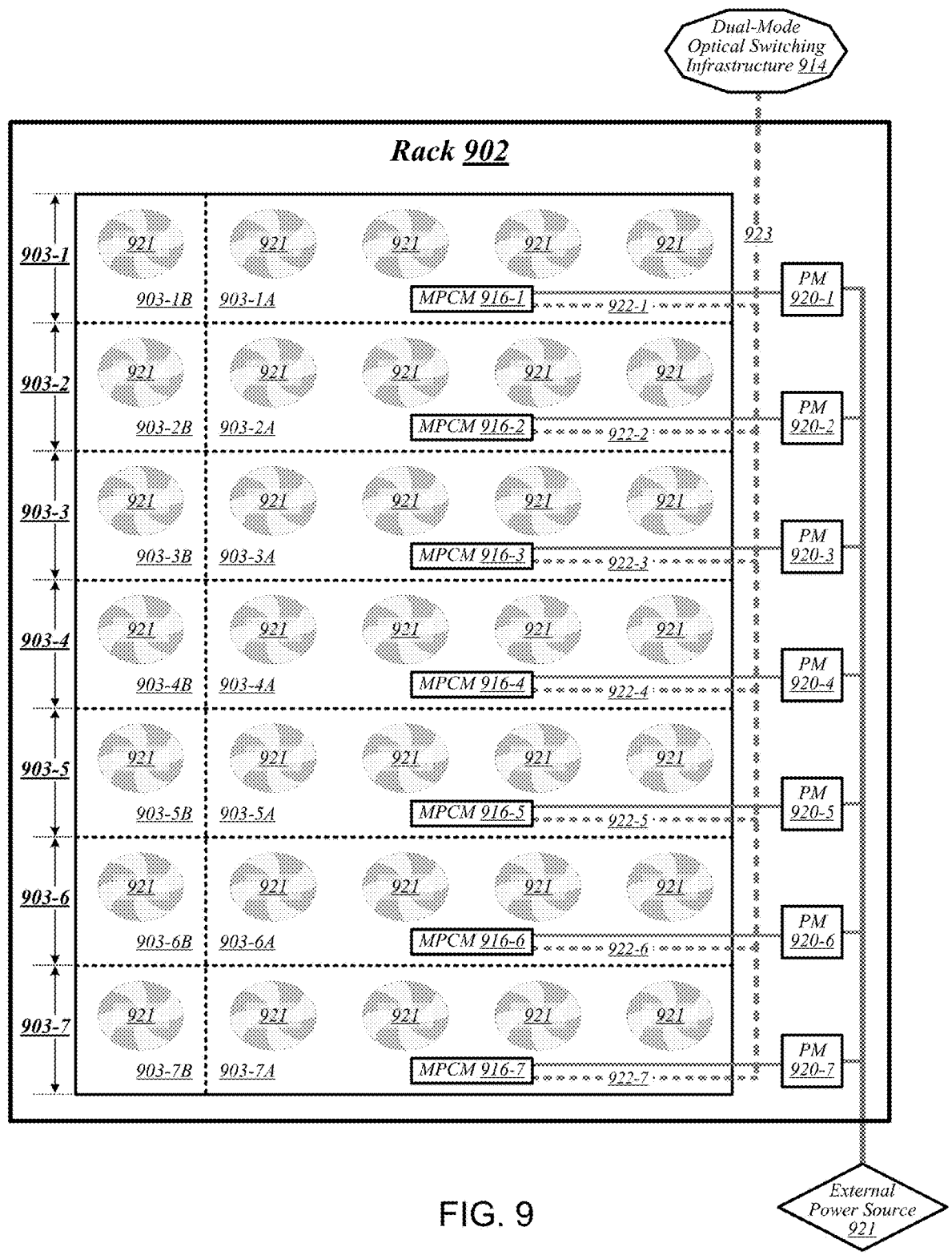
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
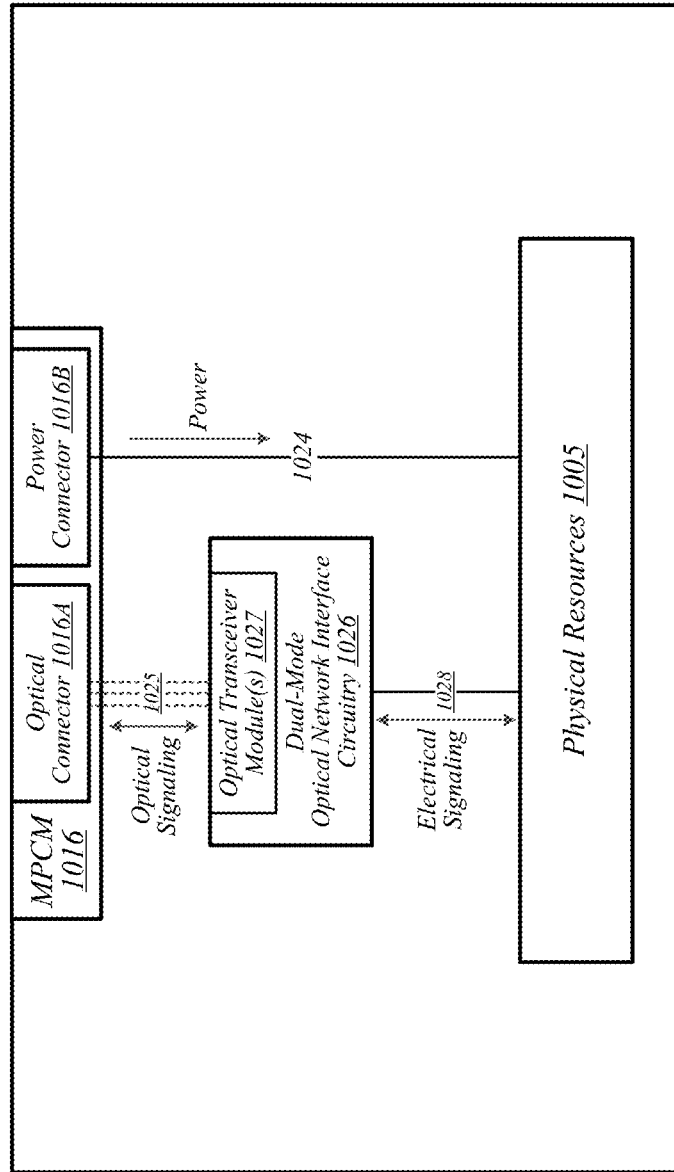
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
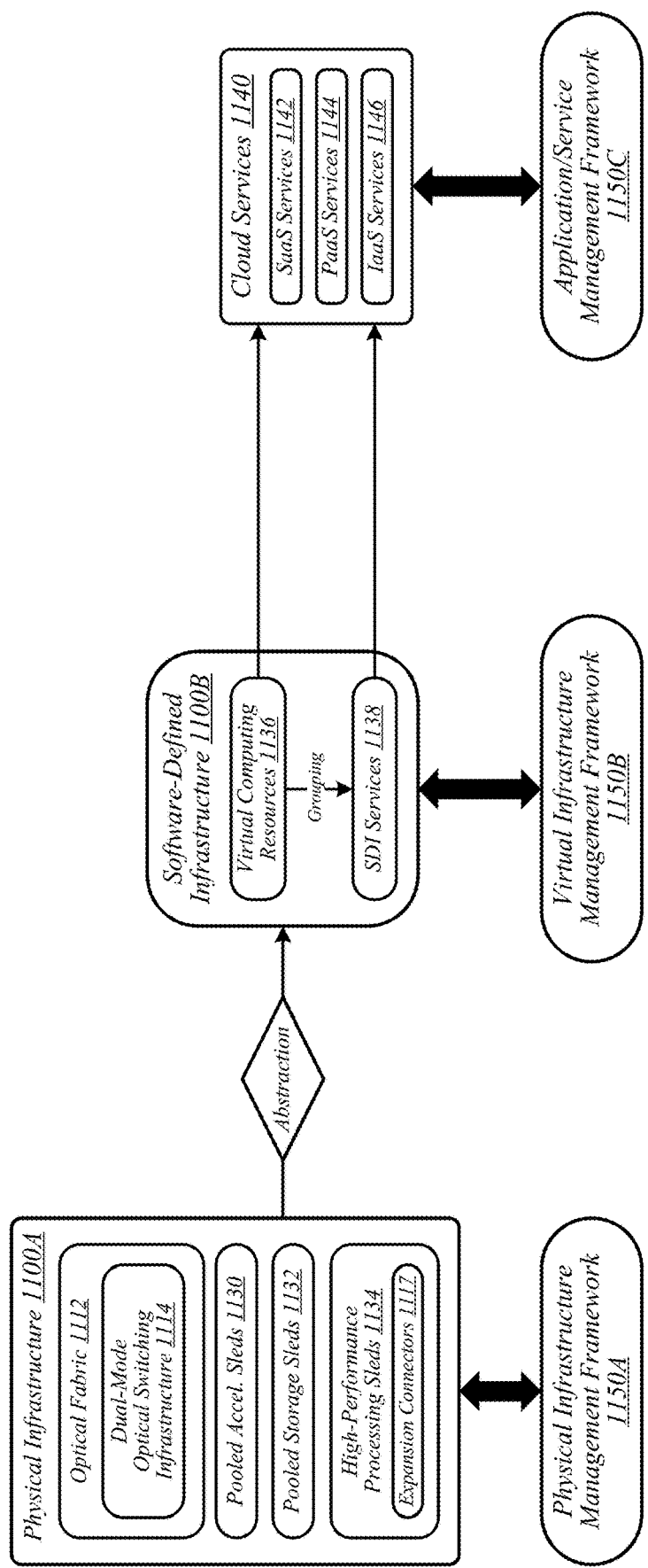
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100/B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
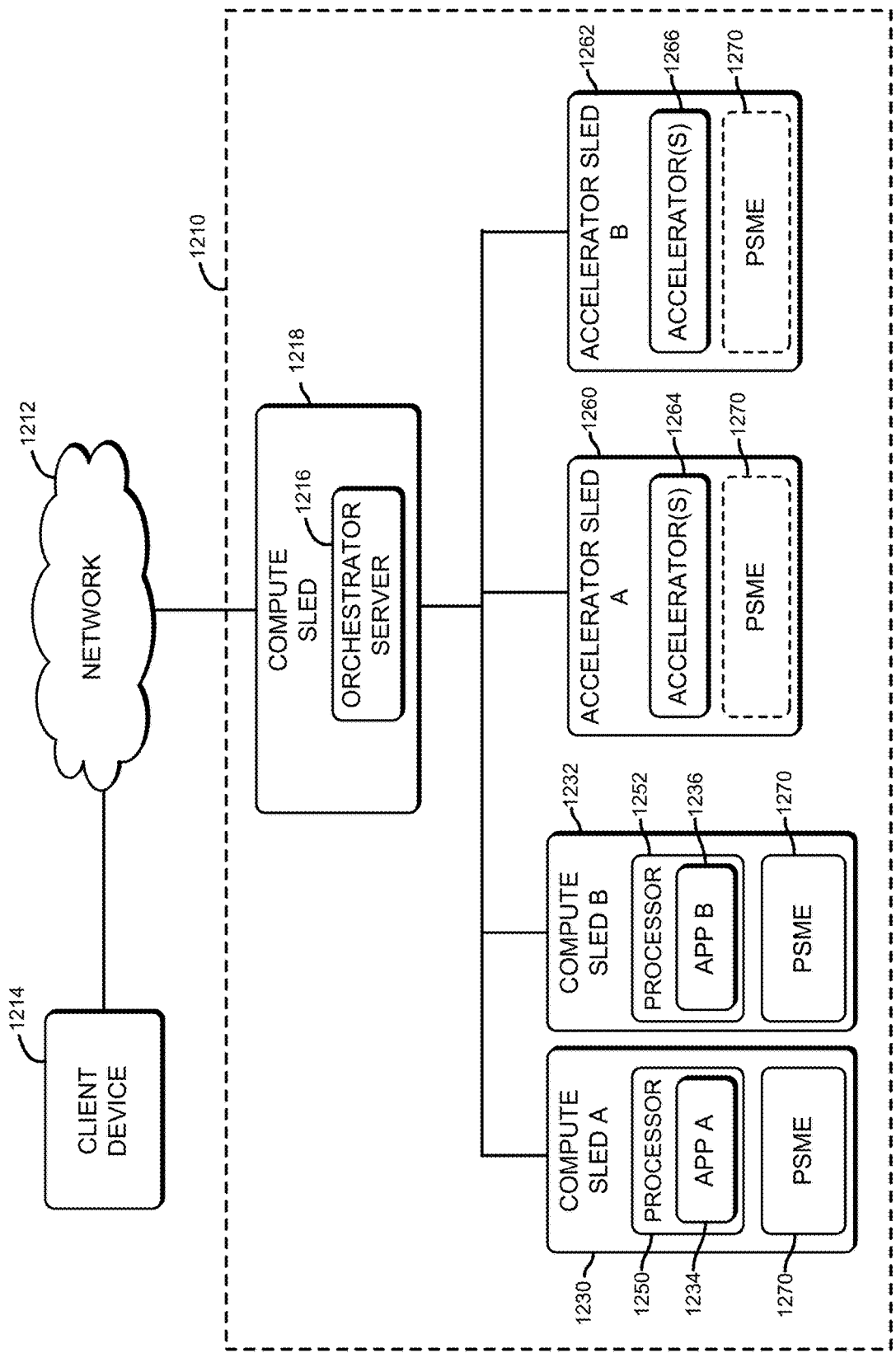
FIG. 12 is a simplified block diagram of at least one embodiment of a system for managing disaggregated accelerator resources using a pooled system management engine (PSME) device.

Referring now to FIG. 12, a system 1210 for managing disaggregated accelerator resources in a disaggregated architecture may be implemented in accordance with the data centers 100, 300, 400, 1100 described above with reference to FIGS. 1, 3, 4, and 11. In the illustrative embodiment, managing disaggregated accelerator resources means facilitating application workload processing by receiving workload processing requests from an application and distributing all or part of the workload to accelerator devices. These accelerator devices are selected based on configuration and capacity to efficiently process an application workload (e.g., cryptographic operations, compression operations, image processing operations, packet inspection operations, etc.). The accelerator devices may be located on the same compute device (e.g., compute sled) that is executing the application and/or on one or more remote compute devices (e.g., remote accelerator sleds) which may be otherwise inaccessible to the application. The workload processing requests are received and fulfilled by a pooled system management engine (PSME) that may be locally installed on the same host compute device as the application requesting workload processing. The term "PSME" is nomenclature used by Intel Corporation and is used herein merely for convenience. It should be understood that the PSME may be embodied as any sled-, rack-, or tray-level management engine. The out-of-box functions of the PSME are extended to provide the disaggregated accelerator management capability described herein, such that the application can leverage accelerator devices that may be otherwise inaccessible.

In the illustrative embodiment, the system 1210 includes an orchestrator server 1216 in communication with compute sleds 1230, 1232 and accelerator sleds 1260, 1262. In the illustrative embodiment, the orchestrator server 1216 is included within a compute sled 1218. One or more of the sleds 1230, 1232, 1260, or 1262 may be grouped into a managed node, such as by the orchestrator server 1216, to collectively perform a workload, such as an application. A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1216 at the time a workload is to be assigned to the managed node or at any other time, and may exist regardless of whether any workloads are presently assigned to the managed node. The system 1210 may be located in a data center and provide storage and compute services (e.g., cloud services) to a client device 1214 that is in communication with the system 1210 through a network 1212. The orchestrator server 1216 may support a cloud operating environment, such as OpenStack, and managed nodes established by the orchestrator server 1216 may execute one or more applications or processes (i.e., workloads), such as in virtual machines or containers, on behalf of a user of the client device 1214. In the illustrative embodiment, the compute sled 1230 executes a workload 1234 (e.g., an application) with one or more processors 1250, and the compute sled 1232 executes another workload 1236 (e.g., another application) with one or more processors 1252. Further, one or more of compute sleds 1230 and 1232 may host a PSME 1270, configured to perform the disaggregated accelerator resource management functions described above. Additionally, the accelerator sled 1260 includes one or more accelerator devices 1264 (e.g., physical accelerator resources 205-2) and the accelerator sled 1266 also includes one or more accelerator devices 1266 (e.g., physical accelerator resources 205-2).

As described in more detail herein, a sled (e.g., the compute sled 1230) equipped with a PSME 1270 may detect accelerator devices within the data center (e.g., the system 1210), including discovering information about each detected accelerator device (e.g., processing power, configuration, specialized functionality, average utilization, or the like), receive requests from the application for assistance in accelerating the execution of application, and based on the discovery process and an analysis of the request from the application, the sled, using the PSME 1270, may schedule one or more portions (e.g., tasks) of the application to be accelerated by a corresponding accelerator device available in the system 1210 that is suited to accelerating the task (e.g., scheduling a cryptography-related task on an accelerator device that includes specialized circuitry for performing cryptographic operations). Further, in the illustrative embodiment, the PSME 1270 performs the above functions out-of-band (e.g., without consuming compute capacity of the sled that would otherwise be used to execute the application and/or an underlying operating system).

Figure 13:
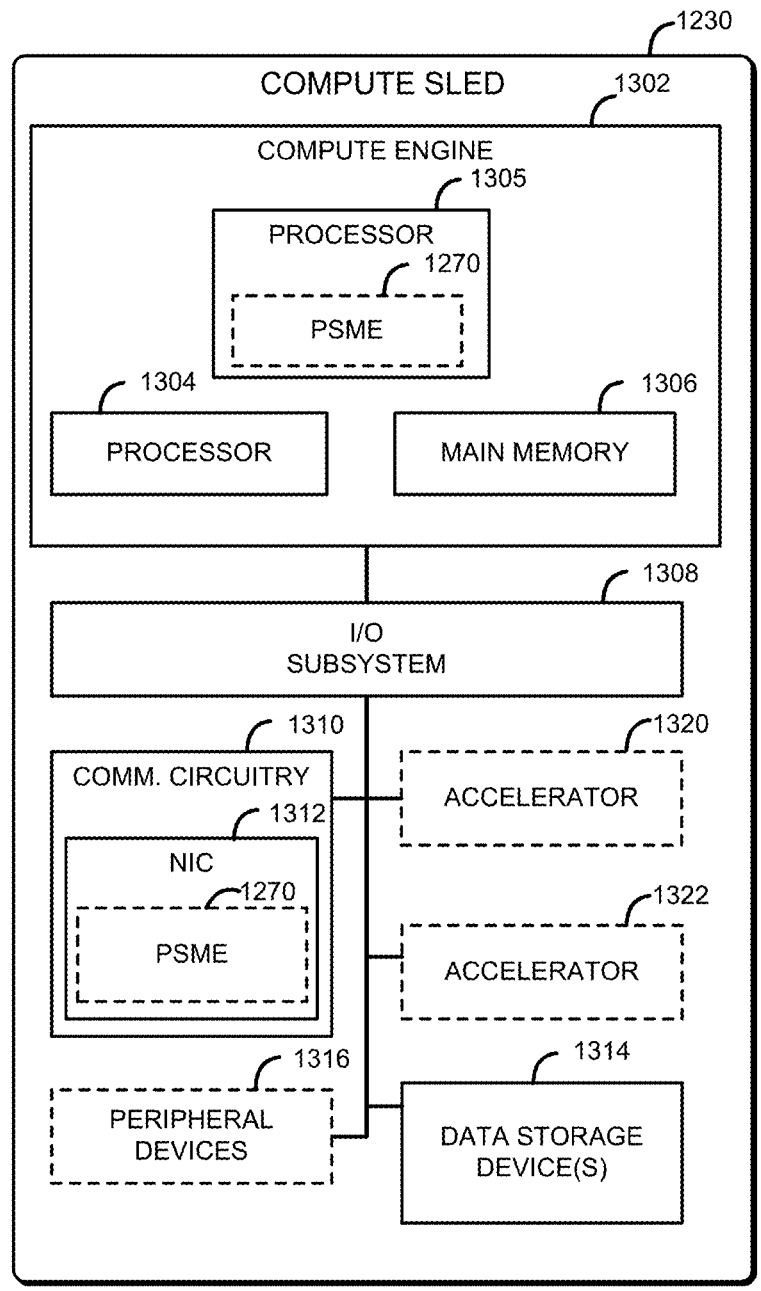
FIG. 13 is a simplified block diagram of at least one embodiment of a compute sled of the system of FIG. 12.

Referring now to FIG. 13, the compute sled 1230 may be embodied as any type of compute device capable of performing the functions described herein, including executing a workload (e.g., the workload 1234), obtaining a request from the workload 1234 to accelerate the execution of the workload, identifying the accelerator devices available in the system 1210 (e.g., on the compute sled 1230 and/or in other sleds 1232, 1260, 1262) within the system 1210, including their features (e.g., types of functions each accelerator device is able to accelerate) and availability (e.g., present load), and selecting one or more of the accelerator devices to execute one or more portions (e.g., tasks) of the workload to increase the speed of execution of the workload. In the illustrative embodiment, the compute sled 1230 performs the above functions without consuming compute capacity that would otherwise be used by the application (e.g., the workload) and/or an operating system supporting the application.

As shown in FIG. 13, the illustrative compute sled 1230 includes a compute engine 1302, an input/output (I/O) subsystem 1308, communication circuitry 1310, and one or more data storage devices 1314. The compute sled 1230 may also include one or more accelerators, depicted as accelerators 1320 and 1322. Of course, in other embodiments, the compute sled 1230 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. Additionally, in some embodiments, the compute engine 1302 includes or is embodied as a processor 1304 (e.g., similar to the processor(s) 1250) and a memory 1306. The processor 1304 may be embodied as any type of processor capable of executing a workload (e.g., the application 1234). For example, the processor 1304 may be embodied as a single or multi-core processor(s), a microcontroller, or other processor or processing/controlling circuit. In some embodiments, the processor 1304 may be embodied as, include, or be coupled to an FPGA, an application specific integrated circuit (ASIC), reconfigurable hardware or hardware circuitry, or other specialized hardware to facilitate performance of the functions described herein. The PSME 1270 may, in some embodiments, be included within a dedicated processor 1305 that is separate from the processor 1304 that performs other computing functions of the compute engine 1302 (e.g., executing applications). The PSME 1270 may be embodied as a specialized device, such as a co-processor, an FPGA, a graphics processing unit (GPU), or an ASIC, for performing the accelerator resource management operations described above.

As described in more detail herein, the PSME 1270 is configured to manage disaggregated accelerator resources (e.g., by responding to workload processing requests with an accelerator service request to, for example, the orchestrator 1216 for accelerator services from remote accelerators, such as on accelerator sleds 1260, 1262). In addition, and as described above, the compute sled 1230 includes accelerators 1320 and 1322 that may be configured to perform acceleration tasks (e.g., cryptographic operations on an accelerator specially configured to perform cryptographic operations). The PSME 1270 is configured to direct all or part of a workload from a workload processing request to accelerator 1320 and/or accelerator 1322 (i.e., accelerators hosted by the same compute sled as that running the application and the PSME 1270) in an out-of-band capacity (e.g., without consuming compute capacity of the sled that would otherwise be used to execute the application and/or an underlying operating system). In some embodiments, the PSME 1270 is configured to direct all or part of a workload from a workload processing request to accelerator 1320 and/or accelerator 1322 in an in-band capacity as well if secure and authenticated channels are used (e.g., by consuming compute capacity of the sled that would otherwise be used to execute the application and/or an underlying operating system).

The main memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance. In some embodiments, all or a portion of the main memory 1306 may be integrated into the processor 1304. In operation, the main memory 1306 may store various software and data used during operation such as accelerator configuration data, accelerator directory data, application data, applications, programs, libraries, and drivers.

The compute engine 1302 is communicatively coupled to other components of the compute sled 1230 via the I/O subsystem 1308, which may be embodied as circuitry and/or components to facilitate input/output operations with the compute engine 1302 (e.g., with the processor 1304 and/or the main memory 1306) and other components of the compute sled 1230. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1308 may form a portion of a system-on-a-chip (SoC) and be incorporated, along with one or more of the processor 1304, the main memory 1306, and other components of the compute sled 1230, into the compute engine 1302.

The communication circuitry 1310 may be embodied as any communication circuit, device, or collection thereof, capable of enabling communications over the network 1212 between the compute sled 1230 and another compute device (e.g., the orchestrator server 1216, and/or one or more sleds 1230, 1232, 1260, 1262). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1310 includes a network interface controller (NIC) 1312. The NIC 1312 may be embodied as one or more add-in-boards, daughter cards, network interface cards, controller chips, chipsets, or other devices that may be used by the compute sled 1230 to connect with another compute device (e.g., the orchestrator server 1216 and/or the sleds 1232, 1260, 1262). In some embodiments, the NIC 1312 may be embodied as part of a system-on-a-chip (SoC) that includes one or more processors, or included on a multichip package that also contains one or more processors. In some embodiments, the NIC 1312 may include a local processor (not shown) and/or a local memory (not shown) that are both local to the NIC 1312. In such embodiments, the local processor of the NIC 1312 may be capable of performing one or more of the functions of the compute engine 1302 described herein. Additionally or alternatively, in such embodiments, the local memory of the NIC 1312 may be integrated into one or more components of the compute sled 1230 at the board level, socket level, chip level, and/or other levels. In some embodiments, the PSME 1270 may be included in the NIC 1312.

The one or more illustrative data storage devices 1314, may be embodied as any type of devices configured for short-term or long-term storage of data such as, for example, memory devices and circuits, memory cards, hard disk drives, solid-state drives, or other data storage devices. Each data storage device 1314 may include a system partition that stores data and firmware code for the data storage device 1314. Each data storage device 1314 may also include an operating system partition that stores data files and executables for an operating system.

Additionally or alternatively, the compute sled 1230 may include one or more peripheral devices 1316. Such peripheral devices 1316 may include any type of peripheral device commonly found in a compute device such as a display, speakers, a mouse, a keyboard, and/or other input/output devices, interface devices, and/or other peripheral devices.

The client device 1214, the orchestrator server 1216, and the compute sled 1232, may have components similar to those described in FIG. 13. The description of those components of the compute sled 1230 is equally applicable to the description of components of those devices and is not repeated herein for clarity of the description, with the exception that the client device 1214 and the orchestrator server 1216 do not include the PSME 1270 and, in the illustrative embodiment, may not include accelerators 1320, 1322. Further, it should be appreciated that any of the client device 1214, the orchestrator server 1216, and the compute sleds 1230, 1232, may include other components, sub-components, and devices commonly found in a computing device, which are not discussed above in reference to the compute sled 1230 and not discussed herein for clarity of the description. In addition, the accelerator sleds 1260, 1262 include components similar to those described above, and it should be understood that the accelerator(s) 1264, 1266 shown in FIG. 12 may be similar to the accelerators 1320, 1322 described above with reference to FIG. 13.

As described above, the compute sled 1230, the orchestrator server 1216, and the sleds 1230, 1232, 1260, 1262 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
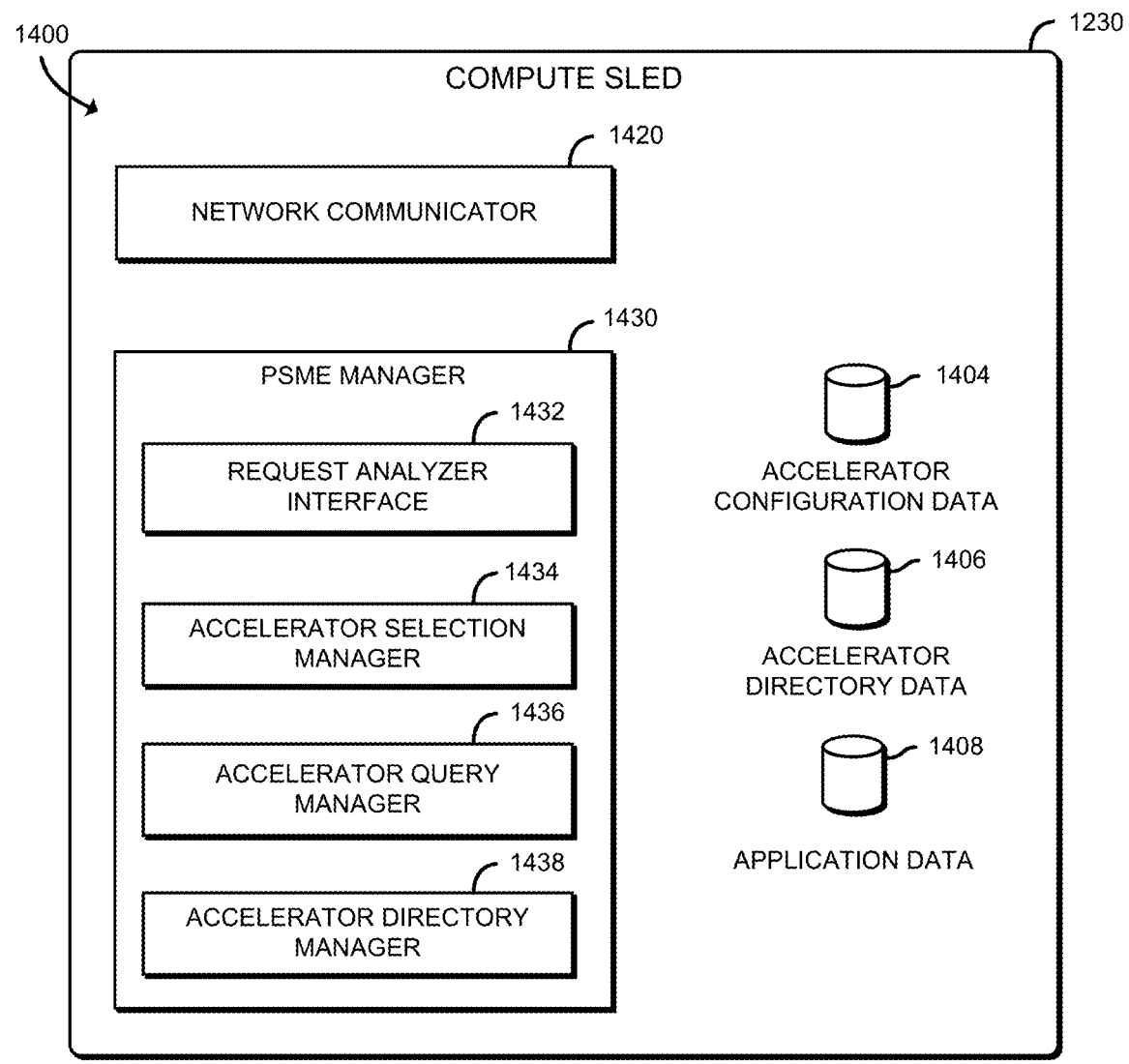
FIG. 14 is a simplified block diagram of at least one embodiment of an environment that may be established by the compute sled of FIGS. 12 and 13.

Referring now to FIG. 14, the compute sled 1230 may establish an environment 1400 during operation. The illustrative environment 1400 includes a network communicator 1420, and a PSME manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, PSME manager circuitry 1430, etc.). It should be appreciated that, in such embodiments, one or more of the network communicator circuitry 1420 or the PSME manager circuitry 1430 may form a portion of one or more of the compute engine 1302, the PSME 1270, the communication circuitry 1310, the I/O subsystem 1308, and/or other components of the compute sled 1230.

Additionally, the illustrative environment 1400 includes accelerator configuration data 1404 which may be embodied as any data indicative of the accelerator configuration, including accelerator processing speed, types of functions that each accelerator is capable of accelerating (e.g., cryptographic operations, compression operations, etc.), parallel processing capacity, specialized configuration modes, accelerator architecture data (e.g., number of cores), associated sled identifier (e.g., associated accelerator sled identifiers), or the like.

Additionally, the illustrative environment 1400 includes accelerator directory data 1406, which may be embodied as any data indicative of a data structure holding lists of accelerator devices, accelerator device types (e.g., FPGA, GPU, ASIC, or the like). In addition, the accelerator directory data 1406 may store accelerator device identifiers in correlation with the corresponding accelerator sled identifiers. The accelerator directory 1406 may also include accelerator usage history data (e.g., applications that most frequently used the accelerator, specialized usages or configurations for the accelerator, like graphics processing or audio processing, or the like), accelerator performance metrics, accelerator age data (e.g., how long the accelerator has been connected to the orchestrator server 1216, whether the accelerator is a newer or older accelerator, whether it was previously removed from commission) or the like.

Additionally, in the illustrative embodiment, the environment 1400 includes application data 1408, which may be embodied as any data indicative of applications requesting workload processing from the PSME 1270. Application data 1408 may also be embodied as any data indicative of application workload processing requests, schedules of workload processing requests (e.g., repetitive requests), or the like.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the compute sled 1230, respectively. To do so, the network communicator 1420 is configured to receive and process data packets from one system or computing device (e.g., a compute sled 1230, 1232) and to prepare and send data packets to another computing device or system (e.g., an accelerator sled 1260, 1262). Accordingly, in some embodiments, at least a portion of the functionality of the network communicator 1420 may be performed by the communication circuitry 1310, and, in the illustrative embodiment, by the NIC 1312.

The PSME manager 1430, which may be embodied as hardware, firmware, software, virtualized hardware, emulated architecture, and/or a combination thereof, is configured to provide efficient disaggregated accelerator management across the system 1210. To do so, in the illustrative embodiment, the PSME manager 1430 includes a request analyzer interface 1432, an accelerator selection manager 1434, an accelerator query manager 1436, and an accelerator directory manager 1438. The request analyzer interface 1432, in the illustrative embodiment, is configured to process application workload processing requests (e.g., from a compute sled 1230) by receiving a workload processing request (e.g., one that originates from the application 1234), determining whether to analyze the workload processing request, analyzing the workload processing request for request metadata, such as one or more request parameters, identifying each request parameter transmitted with the workload processing request, and identifying the workload submitted by the application. In some embodiments, the request analyzer interface 1442 may generate an accelerator service request that is specifically formatted for consumption by the orchestrator server 1216. The accelerator service request is configured to include the one or more request parameters, the workload transmitted by the application, and the selected accelerators (e.g., the accelerator 1264) along with associated accelerator sled identifiers (e.g., for the accelerator sled 1260).

The accelerator selection manager 1434, in the illustrative embodiment, is configured to query the accelerator directory (e.g., as represented by the accelerator directory data 1406) in order to identify accelerator devices that would be best suited to process the workload as defined by the request parameters extracted from the workload processing request. More specifically, and as indicated in the illustrative embodiment, the accelerator selection manager 1434 is configured to query the accelerator directory using the request parameters in order to locate accelerator devices that have a configuration matching the request parameters. As described in more detail herein, the query performed by the accelerator selection manager 1434 will return search results including identifiers for one or more accelerators whose configuration is a match for one or more request parameters. Based on the returned results, the accelerator selection manager 1434 is configured to collect a set of one or more accelerator device identifiers that is then included within the accelerator service request sent to the orchestrator server 1216 as described above.

The accelerator query manager 1436, in the illustrative embodiment, is configured to query an orchestrator (e.g., the orchestrator server 1216) for updated information regarding accelerator devices that are accessible to or in communication with the orchestrator server 1216, to maintain and keep current the accelerator directory (e.g., as represented by accelerator directory data 1406 or collectively by accelerator directory data 1406 and accelerator configuration data 1404). Accordingly, the accelerator query manager 1436 periodically (or on demand) transmits environment discovery queries to the orchestrator server 1216 for accelerator updates. Accelerator updates may include lists of accelerator identifiers for newly connected accelerators, removed accelerators, or the like. The accelerator query manager 1436 will also transmit accelerator configuration update queries to the orchestrator server 1216. The accelerator configuration update queries may request the orchestrator server 1216 to return accelerator configuration data (e.g., to review any recent accelerator configuration changes) for each identified accelerator. The accelerator query manager 1436 is also configured to transmit accelerator health queries to the orchestrator server 1216. The accelerator health queries, in the illustrative embodiment, request data regarding accelerator health metrics, including accelerator uptime statistics, accelerator downtime statistics, time elapsed since accelerator start, time elapsed since accelerator reconfiguration, accelerator error statistics, or the like.

The accelerator directory manager 1438, in the illustrative embodiment, is configured to maintain a current and continuously updated directory of all accelerators that are in communication with the orchestrator server 1216. In the illustrative embodiment, the accelerator directory manager 1438 receives results of the queries transmitted by the accelerator query manager 1436. The accelerator directory manager 1438 uses the query results to update the accelerator directory (e.g., as embodied by the accelerator directory data 1406).

It should be appreciated that each of the request analyzer interface 1432, the accelerator selection manager 1434, the accelerator query manager 1436, and the accelerator directory manager 1438 may be separately embodied as hardware, firmware, software, virtualized hardware, emulated architecture, and/or a combination thereof. For example, the request analyzer interface 1432 may be embodied as a hardware component, while the accelerator selection manager 1434, the accelerator query manager 1436, and the accelerator directory manager 1438 are embodied as virtualized hardware components or as some other combination of hardware, firmware, software, virtualized hardware, emulated architecture, and/or a combination thereof. Further it should be appreciated that in some embodiments, a sled 1230, 1232, 1260, 1262 containing the PSME 1270 may establish an environment similar to the environment 1400 described above.

Figure 15:
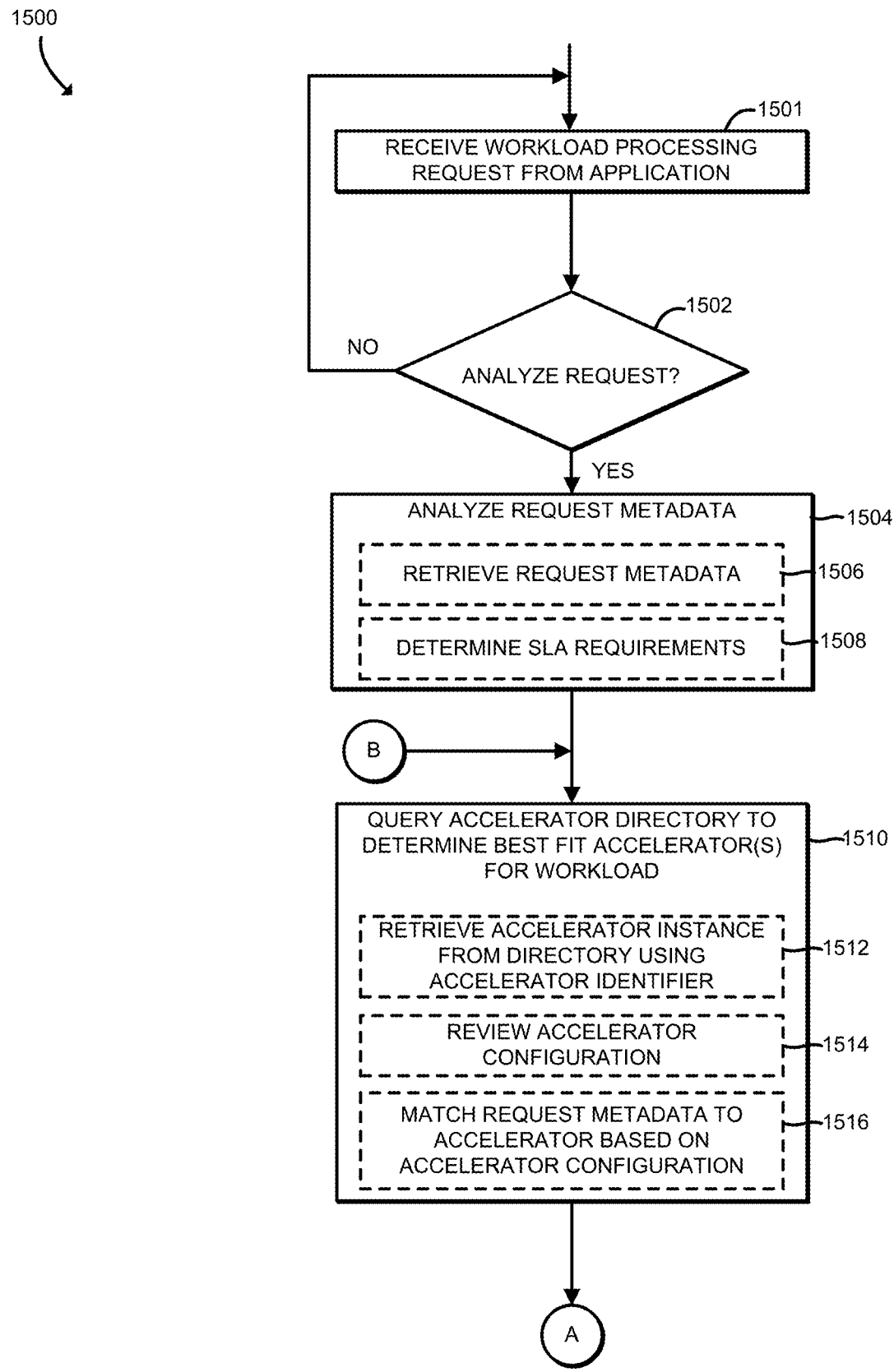
FIGS. 15-18 are a simplified flow diagram of at least one embodiment of a method for managing disaggregated accelerator resources that may be performed by the compute sled of FIGS. 12 and 13.

Referring now to FIG. 15, in use, a compute device (e.g., the compute sled 1230 including the PSME 1270) may execute a method 1500 for managing disaggregated accelerator device resources. For simplicity, the method 1500 is described below as being performed by the PSME 1270. However, it should be understood that in other embodiments, the method 1500 may be performed by one or more other compute devices (e.g., a sled 1232, 1260, 1262 including the PSME 1270). The method 1500 begins with block 1501, in which the PSME 1270 receives a workload processing request from an application. In embodiments, the compute sled 1230 (or some sub-component of the compute sled 1230) may receive and process the workload processing request from the application. In the illustrative embodiment, the PSME 1270 receives the workload processing request from an application and processes the workload processing request in an out-of-band capacity (e.g., without use of the host compute sled's processor or operating system). As described above, in some embodiments the PSME 1270 may direct all or part of a workload from a workload processing request to accelerator 1320 and/or accelerator 1322 in an in-band capacity, with secure and authenticated channels (e.g., by consuming compute capacity of the sled that would otherwise be used to execute the application and/or an underlying operating system).

More specifically, the PSME 1270 receives the processing request from an application that is executing on the same compute sled as the PSME. In other embodiments, the PSME 1270 may receive workload processing requests from applications executing on other compute sleds (e.g., via the orchestrator server 1216). The method 1500 advances to block 1502.

In block 1502, if the PSME 1270 determines whether to analyze the workload processing request, the method 1500 advances to block 1504. Otherwise the method returns to block 1501. In block 1504, the PSME 1270 analyzes the workload processing request. In the illustrative embodiment, the workload processing request will include a defined workload (e.g., data that is to be processed by one or more accelerator devices). In addition, and as illustrated in block 1506, the PSME 1270 retrieves request metadata from the workload processing request. In the illustrative embodiment, the PSME 1270 is configured to parse the workload processing request in order to identify request metadata that further includes one or more request parameters. More specifically, and as illustrated in block 1508, the PSME 1270 determines any service level agreement (SLA) requirements included within the workload processing request. For example, the request parameters may include specific workload processing requirements such as a maximum processing time (e.g., a target latency), a minimum throughput requirement (e.g., a target throughput), a threshold level of logical integrity required during processing, a predefined error-checking mechanism or error rate envelope, or the like. The metadata may additionally or alternatively indicate whether two or more portions of the workload may be accelerated concurrently (e.g., in parallel).

The method 1500 advances to block 1510, in which the PSME 1270 queries an accelerator directory (e.g., the accelerator directory 1406) to determine the accelerator device(s) that would be best fit for the workload processing request. In the illustrative embodiment, the query may, for example, use one of the request parameters as a key. More specifically, the PSME 1270 may query the accelerator directory for all accelerator devices that can satisfy a certain request parameter (e.g., a specific SLA requirement such as completion of processing within a maximum processing time). For example, and as indicated in block 1512, the PSME 1270 retrieves an accelerator instance from the directory using an accelerator identifier. The accelerator identifier may be part of a set of search results generated as a result of querying the accelerator directory. For example, and as indicated in block 1514, the PSME 1270 reviews the accelerator configuration. As described earlier with respect to accelerator configuration data 1404, the accelerator configuration may include data such as accelerator processing speed, types of functions that the accelerator is capable of accelerating, parallel processing capacity, specialized configuration modes, accelerator architecture data (e.g., number of cores), associated sled identified (e.g., associated accelerator sled identifiers), or the like.

The method 1500 advances to block 1516, in which the PSME 1270 matches request metadata to the accelerator based on the accelerator configuration. For example, the PSME 1270 may determine that the identified accelerator instance is capable of satisfying each request parameter in the workload processing request. As another example, the PSME 1270 may determine that the single accelerator instance cannot satisfy each request parameter. Accordingly, the PSME 1270 will retrieve another accelerator instance from the accelerator directory (e.g., by re-executing the query as described with respect to block 1510. As a result, the PSME 1270 determines a combination of accelerator resources that can together satisfy all of the request parameters in the workload processing request.

Figure 16:
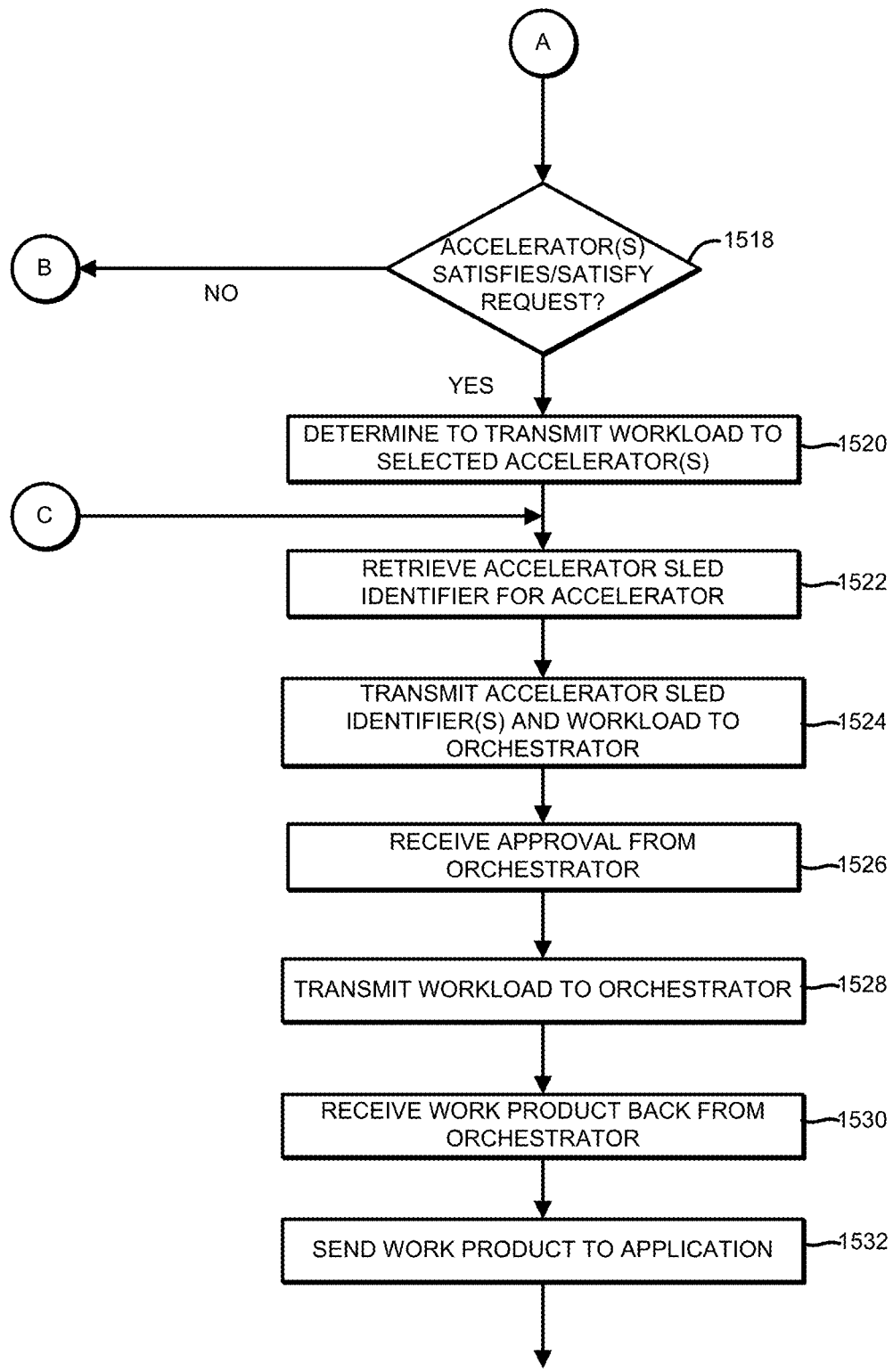

Referring now to FIG. 16, in use, the method 1500 advances to block 1518, in which the PSME 1270 determines whether the accelerator or accelerators retrieved as a result of the query in block 1510 are able to satisfy all request parameters. If the retrieved accelerator or accelerators are not able to satisfy all request parameters, the method 1500 returns to block 1510 to continue to query the accelerator directory for accelerators that satisfy all request parameters. In some embodiments, rather than locally determining the accelerator(s) capable of satisfying the request, the compute sled 1230 may send the request with the request parameter(s) to the orchestrator server 1216 and receive, in response, an identification of the accelerator(s) that are capable of processing the workload in accordance with the request parameter(s). The method 1500 advances to block 1520. In the illustrative embodiment, the PSME 1270 determines to transmit the workload from the workload processing request to the selected accelerator(s). The method 1500 advances to block 1522, in which the PSME 1270 retrieves, from the accelerator directory, the accelerator sled identifier for the selected accelerator(s).

Using the accelerator sled identifier(s), the method 1500 advances to block 1524. The compute sled 1230 is configured to transmit outgoing messages from the orchestrator server 1216. In the illustrative embodiment, the PSME 1270 provides the accelerator sled identifier(s) for the selected accelerator(s) to the orchestrator server 1216 (e.g., in an accelerator service request). The method 1500 advances to block 1526. The compute sled 1230 is configured to receive incoming messages from the orchestrator server 1216. In the illustrative embodiment, the PSME 1270 receives an approval from the orchestrator server 1216 representing that the orchestrator server 1216 approves the transmission of the workload from the PSME 1270 to the one or more accelerators identified to process the workload. As described earlier, the accelerators may be hosted by accelerator sleds that are not hosts of the PSME 1270. In a related embodiment, the accelerator(s) may be local to the compute sled 1230 that also hosts the PSME 1270. The method 1500 advances to block 1528, in which the PSME 1270 transmits the workload from the application to the orchestrator. In the illustrative embodiment (not shown), the identified accelerators will process the workload as provided from the PSME 1270. The accelerators will complete processing to generate a work product. In the illustrative embodiment, this work product could take the form of processed data. For example, the processed data may be encrypted data, decrypted data, compressed data, decompressed data, search function results, processed audio or video data, or the like. The work product may also be message codes or notifications. For example, the work product may be a notification that the provided workload resulted in a certain audio or visual state on an audio or visual display device, a specific network state, confirmation of a remote wireless or wired communication, a receipt or transmission of a signal, a test result, or the like.

The method 1500 advances to block 1530, in which the PSME 1270 receives the work product back from the orchestrator server 1216. More specifically, the identified accelerator(s) will process the provided workload and return the resulting work product to the orchestrator server 1216. The orchestrator server 1216 then transmits the work product to the PSME 1270. The method 1500 advances to block 1532, in which the PSME 1270 sends the work product to the application.

Figure 17:
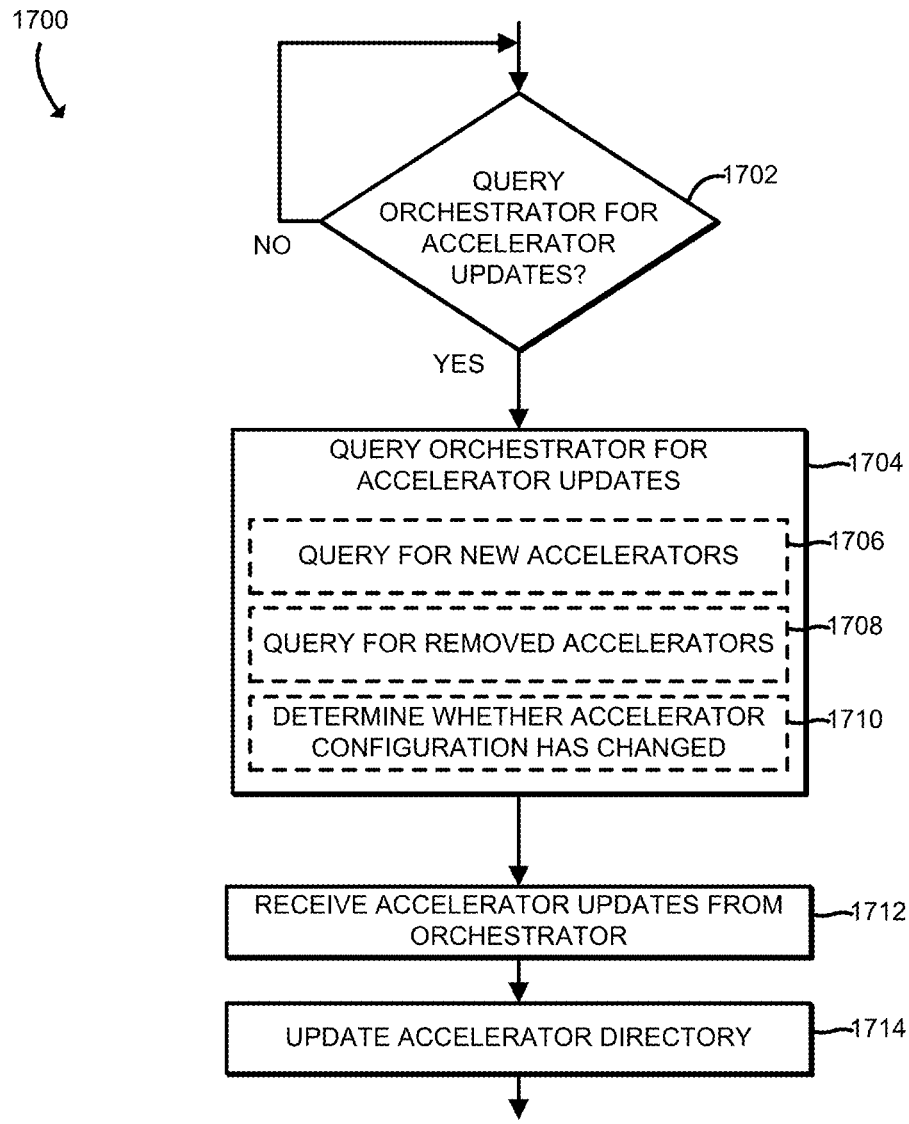

Referring now to FIG. 17, in use, a compute device (e.g., the compute sled 1230 and/or another sled 1232, 1260, 1262 including the PSME 1270) may execute a method 1700 for managing disaggregated accelerator device resources. More specifically, the method 1700 pertains to querying an orchestrator (e.g., the orchestrator server 1216) for updated information regarding accelerator devices that are accessible to or in communication with the orchestrator server 1216. The objective is to maintain and keep current the accelerator directory (e.g., as represented by accelerator directory data 1406 or collectively by accelerator directory data 1406 and accelerator configuration data 1404). The method 1700 begins at block 1702, in which the PSME 1270 determines whether to query orchestrator for accelerator updates. For example, and in the illustrative embodiment, the PSME 1270 may have a regularly scheduled process to query the orchestrator server 1216 for accelerator updates. As another example, the PSME 1270 is configured to query the orchestrator server 1216 on demand by an operator (e.g., a human supervisor of the compute sled 1230).

The method 1700 advances to block 1704, in which the PSME 1270 queries the orchestrator server 1216 for accelerator updates. For example, and as indicated in block 1706, the PSME 1270 queries for any new accelerators that have entered into communication with the orchestrator server 1216. In a related embodiment, the PSME 1270 may query the orchestrator server 1216 for accelerator identifiers for all accelerators connected to the orchestrator server 1216. The PSME 1270 will then compare the list of accelerators returned by the orchestrator server 1216 to the accelerator directory maintained by the PSME 1270. The PSME 1270 uses the comparison to identify new accelerators. Additionally, and as indicated in block 1708, the PSME 1270 queries the orchestrator server 1216 for removed accelerators. Similar to block 1706, the orchestrator may return a list of accelerator identifiers for removed accelerators that the PSME 1270 then uses to remove accelerator entries in its accelerator directory. In a related embodiment, the PSME 1270 may query the orchestrator server 1216 for all accelerators connected to the orchestrator server 1216. The PSME 1270 will then compare the list of accelerators returned by the orchestrator server 1216 to the accelerator directory maintained by the PSME 1270. The PSME 1270 uses the comparison to identify removed accelerators.

Additionally, and as indicated in block 1710, the PSME 1270 will determine whether an accelerator configuration has changed for any accelerator in the accelerator directory. More specifically, the PSME 1270 queries the orchestrator server 1216 for accelerator configuration data in addition to accelerator identifiers as described above with respect to blocks 1706 and 1708. For example, the PSME 1270 will transmit one or more accelerator identifiers along with a request for accelerator configuration data for the identified accelerators. The method 1700 advances to block 1712, in which the PSME 1270 receives accelerator updates from the orchestrator. In other words, the orchestrator server 1216 will return accelerator configuration data in response to the query. Using the returned configuration data, the PSME 1270 will determine whether to update the accelerator configuration data stored within the accelerator directory for the identified accelerator. For example, and as indicated in block 1714, the PSME 1270 updates the accelerator directory entry for the identified accelerator in response to a notification from the orchestrator server 1216 of a changed configuration for the identified accelerator.

Figure 18:
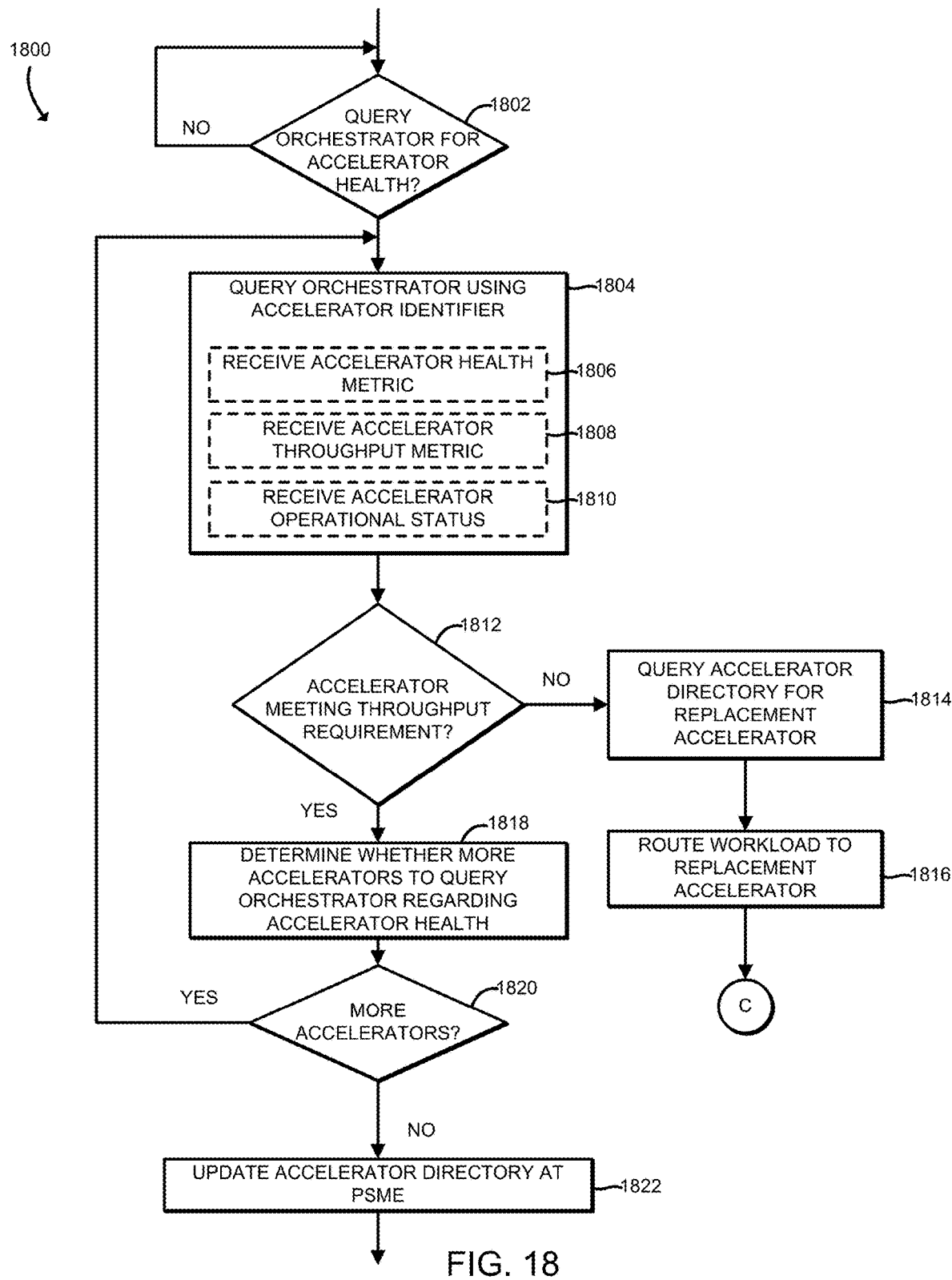

Referring now to FIG. 18, in use, the, a compute device (e.g., the compute sled 1230 and/or another sled 1232, 1260, 1262 including the PSME 1270) may execute a method 1800 for managing disaggregated accelerator device resources. More specifically, the method 1800 pertains to querying an orchestrator (e.g., the orchestrator server 1216) for health data (or status data) regarding accelerator devices that are accessible to or in communication with the orchestrator server 1216.

The method 1800 begins at block 1802, in which the PSME 1270 determines to query the orchestrator server 1216 for one or more accelerator health metrics. The method 1800 advances to block 1804, in which the PSME 1270 queries the orchestrator server 1216 using a particular accelerator identifier (e.g., an accelerator identifier for one of the accelerators 1264). As indicated in block 1806, the PSME 1270 may receive, from the orchestrator server 1216, an accelerator health metric. As used herein, an accelerator health metric may include one or more of accelerator uptime statistics, accelerator downtime statistics, time elapsed since accelerator start, time elapsed since accelerator reconfiguration, accelerator error statistics, or the like. Additionally, and as indicated in block 1808, the PSME 1270 may receive an accelerator throughput metric. As used herein, an accelerator throughput metric may include or more of a present accelerator processing speed, an accelerator processing speed history, or the like. Additionally, and as indicated in block 1810, the PSME 1270 may receive an accelerator operational status. As used herein, an accelerator operational status may include one or more of an accelerator temperature, net accelerator processing load, or the like.

The method 1800 advances to block 1812, in which the PSME 1270 determines whether the accelerator is presently satisfying (or is projected to satisfy) one or more request parameters as defined by the workload processing request (e.g., the workload processing request described above with respect to FIGS. 15 and 16). For example, the PSME 1270 may determine that an identified accelerator is not satisfying a throughput requirement (or the accelerator's defined portion of the throughput requirement) as defined by the request parameters of the workload processing request. Based on this determination, the method 1800 advances to block 1814, in which the PSME 1270 queries the accelerator directory for a replacement accelerator. More specifically, the PSME 1270 queries the accelerator directory using the accelerator configuration data of the previously identified accelerator (or failing accelerator) that is no longer satisfying one or more request parameters. In the illustrative embodiment, querying the accelerator directory using the abovementioned accelerator configuration data returns at least one result in the form of a replacement accelerator. The identified replacement accelerator is capable of performing the workload that was being performed by the failing accelerator that is no longer satisfying request parameters. The method 1800 advances to block 1816, in which the PSME 1270 routes the workload away from the failing accelerator and toward the replacement accelerator. More specifically, the PSME 1270 performs the method blocks 1522 to 1532 of FIG. 16 using the accelerator identifier in order to have the replacement accelerator process the workload. The method 1800 advances to block 1818, in which the PSME 1270 determines whether the orchestrator server 1216 is to be queried regarding the health of more accelerators. For example, the PSME 1270 may have a scheduled task to periodically check for accelerator health during the time an accelerator is processing a workload assigned by the PSME 1270.

The method 1800 advances to block 1820, in which the PSME 1270 determines whether the orchestrator server 1216 should be queried for more accelerator health metrics. If the PSME 1270 determines that health data is required for more accelerators, the method 1800 returns to block 1804. If the PSME 1270 determines that no more accelerator health data is required for the present time period, the method 1800 advances to block 1822, in which the PSME 1270 updates the accelerator directory at the PSME 1270 with the updated accelerator health data as provided by the orchestrator server 1216.

EXAMPLES

Illustrative examples of the technologies disclosed herein are provided below. An embodiment of the technologies may include any one or more, and any combination of, the examples described below.

Example 1 includes a compute device to manage workflow to disaggregated computing resources, the compute device comprising a compute engine to receive a workload processing request, the workload processing request defined by at least one request parameter; determine at least one accelerator device capable of processing a workload in accordance with the at least one request parameter; transmit a workload to the at least one accelerator device; receive a work product produced by the at least one accelerator device from the workload; and provide the work product to an application.

Example 2 includes the subject matter of Example 1, and wherein the compute engine comprises a pooled system management engine (PSME), wherein the PSME operates in an out-of-band capacity with respect to the compute device, and wherein to receive the workload processing request comprises to receive the workload processing request without utilizing a host processor and without utilizing a host operating system of the compute device, to determine the at least one accelerator device capable of processing the workload comprises to determine the at least one accelerator device without utilizing the host processor and without utilizing the host operating system of the compute device, to transmit the workload to the at least one accelerator device comprises to transmit the workload without utilizing the host processor and without utilizing the host operating system of the compute device, to receive the work product produced by the at least one accelerator device comprises to receive the work product without utilizing the host processor and without utilizing the host operating system of the compute device, and to provide the work product to the application comprises to provide the work product to the application without utilizing the host processor and without utilizing the host operating system of the compute device.

Example 3 includes the subject matter of any of Examples 1 and 2, and wherein to determine the at least one accelerator device capable of processing the workload comprises to determine at least one other accelerator device, the at least one other accelerator device being hosted on the compute device that also hosts the PSME.

Example 4 includes the subject matter of any of Examples 1-3, and wherein to receive the workload processing request comprises to receive the workload processing request from an application executed on the compute device.

Example 5 includes the subject matter of any of Examples 1-4, and wherein the plurality of instructions, when executed by the one or more processors, further cause the compute device to parse the workload processing request for the at least one request parameter, wherein the at least one request parameter corresponds to a service-level agreement (SLA) requirement.

Example 6 includes the subject matter of any of Examples 1-5, and wherein the compute engine is further to generate an accelerator device directory, wherein the accelerator device directory stores an accelerator device identifier identifying the at least one accelerator device in correlation with configuration data and an accelerator sled identifier for the at least one accelerator device, and wherein the configuration data is indicative of a number of operations per second that the at least one accelerator device is capable of performing, a function that the at least one accelerator device is capable of accelerating, and a present utilization of the at least one accelerator device.

Example 7 includes the subject matter of any of Examples 1-6, and wherein the compute engine is further to identify a configuration parameter of the at least one accelerator device from the accelerator device directory; and determine that the configuration parameter represents a capability of the at least one accelerator device to process the workload.

Example 8 includes the subject matter of any of Examples 1-7, and wherein the compute engine is further to retrieve an accelerator sled identifier for the at least one accelerator device; and transmit an accelerator device request to an orchestrator, wherein the accelerator device request includes a request to transmit the workload to the at least one accelerator device associated with the accelerator sled identifier.

Example 9 includes the subject matter of any of Examples 1-8, and wherein the compute engine is further to receive the work product from the orchestrator, the work product representing a completion of processing of the workload by the at least one accelerator device.

Example 10 includes the subject matter of any of Examples 1-9, and wherein to transmit a workload to the at least one accelerator device comprises to transmit the workload in-band, through a secure and authenticated channel.

Example 11 includes the subject matter of any of Examples 1-10, and wherein to determine at least one accelerator device capable of processing a workload in accordance with the at least one request parameter comprises to determine, based on an accelerator device directory, the at least one accelerator device capable of processing a workload in accordance with the at least one request parameter.

Example 12 includes the subject matter of any of Examples 1-11, and wherein the determined accelerator device is hosted on a remote device different from the compute device.

Example 13 includes the subject matter of any of Examples 1-12, and wherein to determine the at least one accelerator device capable of processing a workload in accordance with the at least one request parameter comprises to send the workload processing request to an orchestrator server; and receive, from the orchestrator server, an identification of the at least one accelerator device capable of processing the workload.

Example 14 includes the subject matter of any of Examples 1-13, and wherein the at least one request parameter includes metadata indicative of whether two or more portions of the workload can be accelerated concurrently.

Example 15 includes the subject matter of any of Examples 1-14, and wherein the at least one request parameter includes metadata indicative of a target quality of service associated with the workload.

Example 16 includes the subject matter of any of Examples 1-15, and wherein the metadata is indicative of at least one of a target latency or a target throughput associated with the workload.

Example 17 includes a method for managing workflow to disaggregated computing resources, the method comprising receiving, by a compute device, a workload processing request, the workload processing request defined by at least one request parameter; determining, by the compute device, at least one accelerator device capable of processing a workload in accordance with the at least one request parameter; transmitting, by the compute device, a workload to the at least one accelerator device; receiving, by the compute device, a work product produced by the at least one accelerator device from the workload; and providing, by the compute device, the work product to an application.

Example 18 includes the subject matter of Example 17, and wherein the compute device includes a pooled system management engine (PSME), wherein the PSME operates in an out-of-band capacity with respect to the compute device, and wherein receiving the workload processing request comprises receiving the workload processing request without utilizing a host processor and without utilizing a host operating system of the compute device, determining the at least one accelerator device capable of processing the workload comprises determining the at least one accelerator device without utilizing the host processor and without utilizing the host operating system of the compute device, transmitting the workload to the at least one accelerator device comprises transmitting the workload without utilizing the host processor and without utilizing the host operating system of the compute device, receiving the work product produced by the at least one accelerator device comprises receiving the work product without utilizing the host processor and without utilizing the host operating system of the compute device, and providing the work product to the application comprises providing the work product to the application without utilizing the host processor and without utilizing the host operating system of the compute device.

Example 19 includes the subject matter of any of Examples 17 and 18, and wherein determining the at least one accelerator device capable of processing the workload comprises determining at least one other accelerator device, the at least one other accelerator device being hosted on the compute device that also hosts the PSME device.

Example 20 includes the subject matter of any of Examples 17-19, and wherein receiving the workload processing request comprises receiving the workload processing request from an application executing on the compute device.

Example 21 includes the subject matter of any of Examples 17-20, and further including parsing, by the compute device, the workload processing request for the at least one request parameter, wherein the at least one request parameter corresponds to a service-level agreement (SLA) requirement.

Example 22 includes the subject matter of any of Examples 17-21, and further including generating an accelerator device directory, wherein the accelerator device directory stores an accelerator device identifier identifying the at least one accelerator device in correlation with configuration data and an accelerator sled identifier for the at least one accelerator device, and wherein the configuration data is indicative of a number of operations per second that the at least one accelerator device is capable of performing, a function that the at least one accelerator device is capable of accelerating, and a present utilization of the at least one accelerator device.

Example 23 includes the subject matter of any of Examples 17-22, and further including identifying, by the compute device, a configuration parameter of the at least one accelerator device from the accelerator device directory; and determining, by the compute device, that the configuration parameter represents a capability of the at least one accelerator device to process the workload.

Example 24 includes the subject matter of any of Examples 17-23, and further including retrieving, by the compute device, an accelerator sled identifier for the at least one accelerator device; and transmitting, by the compute device, an accelerator device request to an orchestrator, wherein the accelerator device request includes a request to transmit the workload to the at least one accelerator device associated with the accelerator sled identifier.

Example 25 includes the subject matter of any of Examples 17-24, and further including receiving the work product from the orchestrator, wherein the work product represents a completion of processing of the workload by the at least one accelerator device.

Example 26 includes the subject matter of any of Examples 17-25, and wherein transmitting a workload to the at least one accelerator device comprises transmitting the workload in-band, through a secure and authenticated channel.

Example 27 includes the subject matter of any of Examples 17-26, and wherein determining at least one accelerator device capable of processing a workload in accordance with the at least one request parameter comprises determining, based on an accelerator device directory, the at least one accelerator device capable of processing a workload in accordance with the at least one request parameter.

Example 28 includes the subject matter of any of Examples 17-27, and wherein the determined accelerator device is hosted on a remote device different from the compute device.

Example 29 includes the subject matter of any of Examples 17-28, and wherein determining the at least one accelerator device capable of processing a workload in accordance with the at least one request parameter comprises sending the workload processing request to an orchestrator server; and receiving, from the orchestrator server, an identification of the at least one accelerator device capable of processing the workload.

Example 30 includes the subject matter of any of Examples 17-29, and wherein the at least one request parameter includes metadata indicative of whether two or more portions of the workload can be accelerated concurrently.

Example 31 includes the subject matter of any of Examples 17-30, and wherein the at least one request parameter includes metadata indicative of a target quality of service associated with the workload.

Example 32 includes the subject matter of any of Examples 17-31, and wherein the metadata is indicative of at least one of a target latency or a target throughput associated with the workload.

Example 33 includes one or more machine-readable storage media comprising a plurality of instructions stored thereon that, in response to being executed, cause a compute device to perform the method of any of Examples 17-32.

Example 34 includes a compute device comprising means for performing the method of any of Examples 17-32.

Example 35 includes a compute device comprising manager circuitry to receive a workload processing request, the workload processing request defined by at least one request parameter; determine at least one accelerator device capable of processing a workload in accordance with the at least one request parameter; transmit a workload to the at least one accelerator device; receive a work product produced by the at least one accelerator device from the workload; and provide the work product to an application.

Example 36 includes the subject matter of Example 35, and wherein the compute device includes a pooled system management engine (PSME), wherein the PSME operates in an out-of-band capacity with respect to the compute device, and the management circuitry is to operate in an out-of-band capacity with respect to the compute device, and wherein to receive the workload processing request comprises to receive the workload processing request without utilizing a host processor and without utilizing a host operating system of the compute device, to determine the at least one accelerator device capable of processing the workload comprises to determine the at least one accelerator device without utilizing the host processor and without utilizing the host operating system of the compute device, to transmit the workload to the at least one accelerator device comprises to transmit the workload without utilizing the host processor and without utilizing the host operating system of the compute device, to receive the work product produced by the at least one accelerator device comprises to receive the work product without utilizing the host processor and without utilizing the host operating system of the compute device, and to provide the work product to the application comprises to provide the work product to the application without utilizing the host processor and without utilizing the host operating system of the compute device.

Example 37 includes the subject matter of any of Examples 35 and 36, and wherein to determine the at least one accelerator device capable of processing the workload comprises to determine at least one other accelerator device, the at least one other accelerator device being hosted on the compute device that also hosts the PSME.

Example 38 includes the subject matter of any of Examples 35-37, and wherein to receive the workload processing request comprises to receive the workload processing request from an application executed on the compute device.

Example 39 includes the subject matter of any of Examples 35-38, and wherein the manager circuitry is further to parse the workload processing request for the at least one request parameter, and wherein the at least one request parameter corresponds to a service-level agreement (SLA) requirement.

Example 40 includes the subject matter of any of Examples 35-39, and wherein the manager circuitry is further to generate an accelerator device directory, wherein the accelerator device directory stores an accelerator device identifier identifying the at least one accelerator device in correlation with configuration data and an accelerator sled identifier for the at least one accelerator device, and wherein the configuration data is indicative of a number of operations per second that the at least one accelerator device is capable of performing, a function that the at least one accelerator device is capable of accelerating, and a present utilization of the at least one accelerator device.

Example 41 includes the subject matter of any of Examples 35-40, and wherein the manager circuitry is further to identify a configuration parameter of the at least one accelerator device from the accelerator device directory; and determine that the configuration parameter represents a capability of the at least one accelerator device to process the workload.

Example 42 includes the subject matter of any of Examples 35-41, and wherein the manager circuitry is further to retrieve an accelerator sled identifier for the at least one accelerator device; further comprising network communication circuitry to transmit an accelerator device request to an orchestrator, wherein the accelerator device request includes a request to transmit the workload to the at least one accelerator device associated with the accelerator sled identifier.

Example 43 includes the subject matter of any of Examples 35-42, and wherein the network communication circuitry is further to receive the work product from the orchestrator, the work product representing a completion of processing of the workload by the at least one accelerator device.

Example 44 includes the subject matter of any of Examples 35-43, and wherein to transmit a workload to the at least one accelerator device comprises to transmit the workload in-band, through a secure and authenticated channel.

Example 45 includes the subject matter of any of Examples 35-44, and wherein to determine at least one accelerator device capable of processing a workload in accordance with the at least one request parameter comprises to determine, based on an accelerator device directory, the at least one accelerator device capable of processing a workload in accordance with the at least one request parameter.

Example 46 includes the subject matter of any of Examples 35-45, and wherein the determined accelerator device is hosted on a remote device different from the compute device.

Example 47 includes the subject matter of any of Examples 35-46, and wherein to determine the at least one accelerator device capable of processing a workload in accordance with the at least one request parameter comprises to send the workload processing request to an orchestrator server; and receive, from the orchestrator server, an identification of the at least one accelerator device capable of processing the workload.

Example 48 includes the subject matter of any of Examples 35-47, and wherein the at least one request parameter includes metadata indicative of whether two or more portions of the workload can be accelerated concurrently.

Example 49 includes the subject matter of any of Examples 35-48, and wherein the at least one request parameter includes metadata indicative of a target quality of service associated with the workload.

Example 50 includes the subject matter of any of Examples 35-49, and wherein the metadata is indicative of at least one of a target latency or a target throughput associated with the workload.

Example 51 includes a compute device comprising circuitry for receiving a workload processing request, the workload processing request defined by at least one request parameter; means for determining at least one accelerator device capable of processing a workload in accordance with the at least one request parameter; circuitry for transmitting a workload to the at least one accelerator device; circuitry for receiving a work product produced by the at least one accelerator device from the workload; and circuitry for providing the work product to an application.

Example 52 includes the subject matter of Example 51, and wherein the circuitry for receiving the workload processing request comprises circuitry for receiving the workload processing request without utilizing a host processor and without utilizing a host operating system of the compute device, the means for determining the at least one accelerator device capable of processing the workload comprises circuitry for determining the at least one accelerator device without utilizing the host processor and without utilizing the host operating system of the compute device, the circuitry for transmitting the workload to the at least one accelerator device comprises circuitry for transmitting the workload without utilizing the host processor and without utilizing the host operating system of the compute device, the circuitry for receiving the work product produced by the at least one accelerator device comprises circuitry for receiving the work product without utilizing the host processor and without utilizing the host operating system of the compute device, and the circuitry for providing the work product to the application comprises circuitry for providing the work product to the application without utilizing the host processor and without utilizing the host operating system of the compute device.

Example 53 includes the subject matter of any of Examples 51 and 52, and wherein the means for determining the at least one accelerator device capable of processing the workload comprises circuitry for determining at least one other accelerator device, the at least one other accelerator device being hosted on the compute device that also hosts the PSME device.

Example 54 includes the subject matter of any of Examples 51-53, and wherein the circuitry for receiving the workload processing request comprises circuitry for receiving the workload processing request from an application executing on the compute device.

Example 55 includes the subject matter of any of Examples 51-54, and further including circuitry for parsing the workload processing request for the at least one request parameter, wherein the at least one request parameter corresponds to a service-level agreement (SLA) requirement.

Example 56 includes the subject matter of any of Examples 51-55, and further including circuitry for generating an accelerator device directory, wherein the accelerator device directory stores an accelerator device identifier identifying the at least one accelerator device in correlation with configuration data and an accelerator sled identifier for the at least one accelerator device, and wherein the configuration data is indicative of a number of operations per second that the at least one accelerator device is capable of performing, a function that the at least one accelerator device is capable of accelerating, and a present utilization of the at least one accelerator device.

Example 57 includes the subject matter of any of Examples 51-56, and further including circuitry for identifying a configuration parameter of the at least one accelerator device from the accelerator device directory; and determining that the configuration parameter represents a capability of the at least one accelerator device to process the workload.

Example 58 includes the subject matter of any of Examples 51-57, and further including circuitry for retrieving an accelerator sled identifier for the at least one accelerator device; and transmitting an accelerator device request to an orchestrator, wherein the accelerator device request includes a request to transmit the workload to the at least one accelerator device associated with the accelerator sled identifier.

Example 59 includes the subject matter of any of Examples 51-58, and further including circuitry for receiving the work product from the orchestrator, wherein the work product represents a completion of processing of the workload by the at least one accelerator device.

Example 60 includes the subject matter of any of Examples 51-59, and wherein the circuitry for transmitting a workload to the at least one accelerator device comprises circuitry for transmitting the workload in-band, through a secure and authenticated channel.

Example 61 includes the subject matter of any of Examples 51-60, and wherein the means for determining at least one accelerator device capable of processing a workload in accordance with the at least one request parameter comprises means for determining, based on an accelerator device directory, the at least one accelerator device capable of processing a workload in accordance with the at least one request parameter.

Example 62 includes the subject matter of any of Examples 51-61, and wherein the determined accelerator device is hosted on a remote device different from the compute device.

Example 63 includes the subject matter of any of Examples 51-62, and wherein the means for determining the at least one accelerator device capable of processing a workload in accordance with the at least one request parameter comprises circuitry for sending the workload processing request to an orchestrator server; and circuitry for receiving, from the orchestrator server, an identification of the at least one accelerator device capable of processing the workload.

Example 64 includes the subject matter of any of Examples 51-63, and wherein the at least one request parameter includes metadata indicative of whether two or more portions of the workload can be accelerated concurrently.

Example 65 includes the subject matter of any of Examples 51-64, and wherein the at least one request parameter includes metadata indicative of a target quality of service associated with the workload.

Example 66 includes the subject matter of any of Examples 51-65, and wherein the metadata is indicative of at least one of a target latency or a target throughput associated with the workload.

The invention claimed is:

1. A compute device to manage workflow to disaggregated computing resources, the compute device comprising:
   a compute engine to:
   receive a workload processing request, the workload processing request defined by at least one request parameter;
   determine at least one accelerator device capable of processing a workload in accordance with the at least one request parameter;
   retrieve an accelerator sled identifier for the at least one accelerator device;
   transmit an accelerator device request to an orchestrator, wherein the accelerator device request includes a request to transmit the workload to the at least one accelerator device associated with the accelerator sled identifier;
   transmit, in response to receiving approval from the orchestrator to transmit the workload, the workload to the at least one accelerator device;
   receive a work product produced by the at least one accelerator device from the workload; and
   provide the work product to an application.

2. The compute device of claim 1, wherein the compute engine comprises a pooled system management engine (PSME), wherein:
   to receive the workload processing request comprises to receive the workload processing request without utilizing a host processor and without utilizing a host operating system of the compute device,
   to determine the at least one accelerator device capable of processing the workload comprises to determine the at least one accelerator device without utilizing the host processor and without utilizing the host operating system of the compute device,
   to transmit the workload to the at least one accelerator device comprises to transmit the workload without utilizing the host processor and without utilizing the host operating system of the compute device,
   to receive the work product produced by the at least one accelerator device comprises to receive the work product without utilizing the host processor and without utilizing the host operating system of the compute device, and
   to provide the work product to the application comprises to provide the work product to the application without utilizing the host processor and without utilizing the host operating system of the compute device.

3. The compute device of claim 2, wherein to determine the at least one accelerator device capable of processing the workload comprises to determine at least one other accelerator device, the at least one other accelerator device being hosted on the compute device that also hosts the PSME.

4. The compute device of claim 1, wherein to receive the workload processing request comprises to receive the workload processing request from an application executed on the compute device.

5. The compute device of claim 1, wherein the compute device is to parse the workload processing request for the at least one request parameter, wherein the at least one request parameter corresponds to a service-level agreement (SLA) requirement.

6. The compute device of claim 1, wherein the compute engine is further to generate an accelerator device directory, wherein the accelerator device directory stores an accelerator device identifier identifying the at least one accelerator device in correlation with configuration data and the accelerator sled identifier for the at least one accelerator device, and wherein the configuration data is indicative of a number of operations per second that the at least one accelerator device is capable of performing, a function that the at least one accelerator device is capable of accelerating, and a present utilization of the at least one accelerator device.

7. The compute device of claim 6, wherein the compute engine is further to:
   identify a configuration parameter of the at least one accelerator device from the accelerator device directory; and
   determine that the configuration parameter represents a capability of the at least one accelerator device to process the workload.

8. The compute device of claim 1, wherein the compute engine is further to receive the work product from the orchestrator, the work product representing a completion of processing of the workload by the at least one accelerator device.

9. The compute device of claim 1, wherein to transmit the workload to the at least one accelerator device comprises to transmit the workload through a secure and authenticated channel.

10. The compute device of claim 1, wherein to determine at least one accelerator device capable of processing a workload in accordance with the at least one request parameter comprises to determine, based on an accelerator device directory, the at least one accelerator device capable of processing a workload in accordance with the at least one request parameter.

11. The compute device of claim 1, wherein the determined at least one accelerator device is hosted on a remote device different from the compute device.

12. The compute device of claim 1, wherein to determine the at least one accelerator device capable of processing a workload in accordance with the at least one request parameter comprises to:
send the workload processing request to an orchestrator server; and
receive, from the orchestrator server, an identification of the at least one accelerator device capable of processing the workload.

13. One or more non-transitory machine-readable storage media comprising a plurality of instructions stored thereon that, in response to being executed, cause a compute device to:
receive a workload processing request, the workload processing request defined by at least one request parameter;
determine at least one accelerator device capable of processing a workload in accordance with the at least one request parameter;
retrieve an accelerator sled identifier for the at least one accelerator device;
transmit an accelerator device request to an orchestrator, wherein the accelerator device request includes a request to transmit the workload to the at least one accelerator device associated with the accelerator sled identifier;
transmit, in response to receiving approval from the orchestrator to transmit the workload, the workload to the at least one accelerator device;
receive a work product produced by the at least one accelerator device from the workload; and
provide the work product to an application.

14. The one or more non-transitory machine-readable storage media of claim 13, wherein the compute device comprises a pooled system management engine (PSME) wherein:
to receive the workload processing request comprises to receive the workload processing request without utilizing a host processor and without utilizing a host operating system of the compute device,
to determine the at least one accelerator device capable of processing the workload comprises to determine the at least one accelerator device without utilizing the host processor and without utilizing the host operating system of the compute device,
to transmit the workload to the at least one accelerator device comprises to transmit the workload without utilizing the host processor and without utilizing the host operating system of the compute device,
to receive the work product produced by the at least one accelerator device comprises to receive the work product without utilizing the host processor and without utilizing the host operating system of the compute device, and
to provide the work product to the application comprises to provide the work product to the application without utilizing the host processor and without utilizing the host operating system of the compute device.

15. The one or more non-transitory machine-readable storage media of claim 14, wherein to determine the at least one accelerator device capable of processing the workload comprises to determine at least one other accelerator device, the at least one other accelerator device being hosted on the compute device that also hosts the PSME.

16. The one or more non-transitory machine-readable storage media of claim 13, wherein to receive the workload processing request comprises to receive the workload processing request from an application executed on the compute device.

17. The one or more non-transitory machine-readable storage media of claim 13, wherein the plurality of instructions further cause the compute device to parse the workload processing request for the at least one request parameter, and wherein the at least one request parameter corresponds to a service-level agreement (SLA) requirement.

18. The one or more non-transitory machine-readable storage media of claim 13, wherein the plurality of instructions further cause the compute device to generate an accelerator device directory, wherein the accelerator device directory stores an accelerator device identifier identifying the at least one accelerator device in correlation with configuration data and the accelerator sled identifier for the at least one accelerator device, and wherein the configuration data is indicative of a number of operations per second that the at least one accelerator device is capable of performing, a function that the at least one accelerator device is capable of accelerating, and a present utilization of the at least one accelerator device.

19. The one or more non-transitory machine-readable storage media of claim 18, wherein the plurality of instructions further cause the compute device to:
identify a configuration parameter of the at least one accelerator device from the accelerator device directory; and
determine that the configuration parameter represents a capability of the at least one accelerator device to process the workload.

20. The one or more non-transitory machine-readable storage media of claim 13, wherein the plurality of instructions further cause the compute device to receive the work product from the orchestrator, the work product representing a completion of processing of the workload by the at least one accelerator device.

21. A compute device comprising:
manager circuitry to:
receive a workload processing request, the workload processing request defined by at least one request parameter;
determine at least one accelerator device capable of processing a workload in accordance with the at least one request parameter;
retrieve an accelerator sled identifier for the at least one accelerator device; and
transmit an accelerator device request to an orchestrator, wherein the accelerator device request includes a request to transmit the workload to the at least one accelerator device associated with the accelerator sled identifier;
transmit, in response to receiving approval from the orchestrator to transmit the workload, the workload to the at least one accelerator device;
receive a work product produced by the at least one accelerator device from the workload; and
provide the work product to an application.

22. The compute device of claim 21, wherein the compute device includes a pooled system management engine (PSME), and wherein:
to receive the workload processing request comprises to receive the workload processing request without utilizing a host processor and without utilizing a host operating system of the compute device,
to determine the at least one accelerator device capable of processing the workload comprises to determine the at least one accelerator device without utilizing the host processor and without utilizing the host operating system of the compute device,
to transmit the workload to the at least one accelerator device comprises to transmit the workload without utilizing the host processor and without utilizing the host operating system of the compute device,
to receive the work product produced by the at least one accelerator device comprises to receive the work product without utilizing the host processor and without utilizing the host operating system of the compute device, and
to provide the work product to the application comprises to provide the work product to the application without utilizing the host processor and without utilizing the host operating system of the compute device.

23. The compute device of claim 22, wherein to determine the at least one accelerator device capable of processing the workload comprises to determine at least one other accelerator device, the at least one other accelerator device being hosted on the compute device that also hosts the PSME.

24. The compute device of claim 21, wherein to receive the workload processing request comprises to receive the workload processing request from an application executed on the compute device.

25. A method for managing workflow to disaggregated computing resources, the method comprising:
  receiving, by a compute device, a workload processing request, the workload processing request defined by at least one request parameter;
  determining, by the compute device, at least one accelerator device capable of processing a workload in accordance with the at least one request parameter;
  retrieving, by the compute device, an accelerator sled identifier for the at least one accelerator device;
  transmitting, by the compute device, an accelerator device request to an orchestrator, wherein the accelerator device request includes a request to transmit the workload to the at least one accelerator device associated with the accelerator sled identifier;
  transmitting, by the compute device and in response to receiving approval from the orchestrator to transmit the workload, the a workload to the at least one accelerator device;
  receiving, by the compute device, a work product produced by the at least one accelerator device from the workload; and
  providing, by the compute device, the work product to an application.

26. The method of claim 25, wherein the compute device includes a pooled system management engine (PSME), wherein:
  receiving the workload processing request comprises receiving the workload processing request without utilizing a host processor and without utilizing a host operating system of the compute device,
  determining the at least one accelerator device capable of processing the workload comprises determining the at least one accelerator device without utilizing the host processor and without utilizing the host operating system of the compute device,
  transmitting the workload to the at least one accelerator device comprises transmitting the workload without utilizing the host processor and without utilizing the host operating system of the compute device,
  receiving the work product produced by the at least one accelerator device comprises receiving the work product without utilizing the host processor and without utilizing the host operating system of the compute device, and
  providing the work product to the application comprises providing the work product to the application without utilizing the host processor and without utilizing the host operating system of the compute device.

27. The method of claim 26, wherein determining the at least one accelerator device capable of processing the workload comprises determining at least one other accelerator device, the at least one other accelerator device being hosted on the compute device that also hosts the PSME.

28. The method of claim 25, wherein receiving the workload processing request comprises receiving the workload processing request from an application executing on the compute device.

\* \* \* \* \*